United States Patent
Myung et al.

(10) Patent No.: US 10,779,289 B2
(45) Date of Patent: Sep. 15, 2020

(54) METHOD FOR ADJUSTING CONTENTION WINDOW SIZE IN WIRELESS COMMUNICATION SYSTEM AND APPARATUS USING SAME

(71) Applicant: LG Electronics Inc., Seoul (KR)

(72) Inventors: Sechang Myung, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/399,111

(22) Filed: Apr. 30, 2019

(65) Prior Publication Data
US 2019/0268912 A1 Aug. 29, 2019

Related U.S. Application Data

(63) Continuation of application No. PCT/KR2019/002442, filed on Feb. 28, 2019.
(Continued)

(30) Foreign Application Priority Data

Mar. 16, 2018 (KR) ........................ 10-2018-0030760

(51) Int. Cl.
*H04W 72/08* (2009.01)
*H04W 72/04* (2009.01)
(Continued)

(52) U.S. Cl.
CPC ............ *H04W 72/082* (2013.01); *H04L 1/18* (2013.01); *H04L 1/1887* (2013.01);
(Continued)

(58) Field of Classification Search
CPC .................................................. H04W 72/082
See application file for complete search history.

(56) References Cited

U.S. PATENT DOCUMENTS

2011/0069669 A1* 3/2011 Dwyer ................. H04L 1/1614
370/329
2017/0367103 A1* 12/2017 Suzuki .................... G06F 21/31
(Continued)

FOREIGN PATENT DOCUMENTS

KR 20130109158 10/2013
WO WO2017030417 2/2017

OTHER PUBLICATIONS

Huawei, HiSilicon, "Remaining details on Aul channel access," R1-1801375, 3GPP TSG RAN WG1 Meeting #92, Athens, Greece, Feb. 26-Mar. 2, 2018, dated Feb. 16, 2018, 9 pages.
Ericsson, "An AUL Channel Access," R1-1802533, 3GPP TSG RAN WG1 Meeting #92, Athens, Greece, Feb. 26-Mar. 2, 2018, dated Feb. 16, 2018, 8 pages.
(Continued)

*Primary Examiner* — Kevin M Cunningham
(74) *Attorney, Agent, or Firm* — Fish & Richardson P.C.

(57) ABSTRACT

Provided are a method for adjusting a contention window size of a UE in a wireless communication system and the UE using the method. The method includes transmitting first data based on an AUL transmission to a BS, transmitting second data based on a grant-based uplink transmission to the BS, receiving first ACK/NACK information for the first data and second ACK/NACK information for the second data through an AUL-DFI, and adjusting the contention window size based on at least one of the first ACK/NACK information and the second ACK/NACK information included in the AUL-DFI. When the first data includes only one TB and the second data includes a plurality of TBs, the second ACK/NACK information is ACK if ACK/NACK for at least one of the plurality of TBs is ACK and the second ACK/NACK information is NACK if ACK/NACKs for all of the plurality of TBs are all NACKs.

15 Claims, 23 Drawing Sheets

Related U.S. Application Data

(60) Provisional application No. 62/669,959, filed on May 10, 2018, provisional application No. 62/636,706, filed on Feb. 28, 2018.

(51) Int. Cl.
*H04W 72/14* (2009.01)
*H04L 1/18* (2006.01)
*H04L 5/00* (2006.01)
*H04W 74/00* (2009.01)

(52) U.S. Cl.
CPC ....... *H04L 5/0055* (2013.01); *H04W 72/0413* (2013.01); *H04W 72/0446* (2013.01); *H04W 72/14* (2013.01); *H04W 74/008* (2013.01)

(56) References Cited

U.S. PATENT DOCUMENTS

| | | | |
|---|---|---|---|
| 2018/0175975 A1* | 6/2018 | Um | H04L 1/1816 |
| 2019/0059001 A1* | 2/2019 | Yerramalli | H04W 16/14 |
| 2019/0081742 A1* | 3/2019 | Li | H04W 76/28 |
| 2019/0159256 A1* | 5/2019 | Talarico | H04W 74/0808 |
| 2019/0223215 A1* | 7/2019 | Tian | H04L 1/0003 |

OTHER PUBLICATIONS

Qualcomm Incorporated, "Autonomous UL transmission in NR unlicensed," R1-1802867, 3GPP TSG RAN WG1 Meeting #92, Athens, Greece, Feb. 26-Mar. 2, 2018, dated Feb. 17, 2018, 9 pages.

Wilus Inc., "Discussion on channel access for AUL transmission," R1-1802933, 3GPP TSG RAN WG1 Meeting #92, Athens, Greece, Feb. 26-Mar. 2, 2018, dated Feb. 17, 2018, 6 pages.

Wilus Inc., "Discussion on channel access for AUL transmission," R1-1720873, 3GPP TSG RAN WG1 Meeting 91, Reno, USA, Nov. 27-Dec. 1, 2017, 4 pages.

Extended European Search Report for European Appln. No. 19761188.2, dated May 25, 2020, 8 pages.

$3^{rd}$ Generation Partnership Project, LG Electronics, "Channel access procedure for autonomous UL access," R1-1719865, 3GPP TSG RAN WG1, Reno, USA, dated Nov. 27-Dec. 1, 2017, 6 pages.

$3^{rd}$ Generation Partnership Project, Intel Corporation, "Summary of email discussion [90-LTE-21] on AUL channel access," R1-1720029, 3GPP TSG RAN WG1, Reno, US, dated Nov. 27-Dec. 1, 2017, 14 pages.

$3^{rd}$ Generation Partnership Project, Samsung, "Channel access for automomous UL access," R1-1801917, 3GPP TSG RAN WG1, Athens, Greece, dated Feb. 26-Mar. 2, 2018, 5 pages.

* cited by examiner

METHOD FOR ADJUSTING CONTENTION WINDOW SIZE IN WIRELESS COMMUNICATION SYSTEM AND APPARATUS USING SAME

CROSS-REFERENCE TO RELATED APPLICATIONS

Pursuant to 35 U.S.C. § 119(e), this application is a continuation of International Application PCT/KR2019/002442, with an international filing date of Feb. 28, 2019, which claims the benefit of U.S. Provisional Application No. 62/636,706, filed on Feb. 28, 2018, U.S. Provisional Application No. 62/669,959, filed on May 10, 2018, and Korean Application No. 10-2018-0030760, filed on Mar. 16, 2018. The disclosures of the prior applications are incorporated by reference in their entirety.

BACKGROUND OF THE INVENTION

Field of the Invention

The present invention relates to wireless communication and, more specifically, to a method for adjusting a contention window size in a wireless communication system and an apparatus using the method.

Related Art

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultra-reliable and low latency communication (URLLC) is discussed. This new technology may be called new radio access technology (new RAT or NR) in the present invention for convenience.

In a cellular communication system such as LTE/NR, methods of using unlicensed bands such as 2.4 GHz mainly used in Wi-Fi system or unlicensed bands such as 5 GHz and 60 GHz which newly attract attention for traffic offloading are under discussion.

Since an unlicensed band is based on the assumption that wireless transmission and reception are performed through contention between communication nodes, it is necessary for each communication node to perform channel sensing before signal transmission to check whether another communication node has not transmitted a signal. This operation is called LBT (Listen before Talk) or a channel access procedure for convenience, and particularly, an operation of checking whether another communication node transmits a signal is defined as carrier sensing (CS) and a case in which it is determined that another communication node does not transmit a signal is defined as confirmation of clear channel assessment (CCA).

In the aforementioned channel access procedure, a channel is sensed in a predetermined time period before data transmission, and when the channel is available in the predetermined time period, data is transmitted when the value of a random backoff counter is 0. Here, the initial value of the counter is determined on the basis of a value which is a contention window size.

When a UE transmits data and receives acknowledgement/negative acknowledgement (ACK/NACK) therefor, the UE can adjust the contention window size on the basis of the ACK/NACK. Here, when the ACK/NACK is for a plurality of transport blocks (codewords), spatial bundling may be necessary in consideration of the size of an information field in which the ACK/NACK is transmitted, and what manner of spatial bundling can reduce interference while efficiently performing UE transmission in an unlicensed band may become an issue.

SUMMARY OF THE INVENTION

A technical object of the present invention is to provide a method for adjusting a contention window size in a wireless communication system and an apparatus using the method.

In one aspect, provided is a method for adjusting a contention window size (CWS) of a user equipment (UE) in a wireless communication system. The method includes transmitting first data based on an autonomous uplink (AUL) transmission to a base station, transmitting second data based on a grant-based uplink transmission to the base station, receiving first acknowledgement/negative acknowledgement (ACK/NACK) information for the first data and second ACK/NACK information for the second data through an AUL-downlink feedback indication (AUL-DFI) and adjusting the contention window size based on at least one of the first ACK/NACK information and the second ACK/NACK information included in the AUL-DFI. When the first data includes only one transport block and the second data includes a plurality of transport blocks, the second ACK/NACK information is ACK if ACK/NACK for at least one of the plurality of transport blocks is ACK and the second ACK/NACK information is NACK if ACK/NACKs for all of the plurality of transport blocks are all NACKs.

The contention window size may be related with determination of an initial value of a counter used for a channel access procedure (CAP) of the UE.

The UE may sense a channel in a first specific duration, and when the channel is idle in the first specific duration and the value of the counter is 0, may transmit the first data to the base station through the channel.

The UE may sense a channel in a second specific duration, and when the channel is idle in the second specific duration and the value of the counter is 0, may transmit the second data to the base station through the channel.

The first data may be data related with a first HARQ process and the second data may be data related with a second HARQ process.

The contention window size of the UE may be increased when NACKs are generated for all of the plurality of transport blocks included in the second data and thus the second ACK/NACK information is NACK.

The contention window size of the UE may be reset to a minimum value when the second ACK/NACK information for the second data is ACK.

The AUL-DFI may include a bitmap, a first bit of the bitmap may indicate ACK/NACK for the first data, and a second bit of the bitmap may indicate ACK/NACK for the second data.

The AUL transmission may be uplink transmission performed without receiving a grant from the base station, and the grant-based uplink transmission may be uplink transmission performed based on a grant received from the base station.

The second ACK/NACK information included in the AUL-DFI may be not used for a hybrid automatic repeat request (HARQ) operation and may be used for adjustment of the contention window size.

When the second data includes a plurality of transport blocks, the second ACK/NACK information may be determined by spatial bundling based on a logical OR operation performed on the plurality of transport blocks.

The first data and the second data may be transmitted through a unlicensed band.

The method may further include receiving a grant which schedules the second data.

In another aspect, provided is a method for transmitting downlink feedback information of a base station in a wireless communication system. The method includes receiving first data based on an autonomous uplink (AUL) transmission from a user equipment (UE), receiving second data based on a grant-based uplink transmission from the UE and transmitting first acknowledgement/negative acknowledgement (ACK/NACK) information for the first data and second ACK/NACK information for the second data through an AUL-downlink feedback indication (AUL-DFI) and adjusting a contention window size based on at least one of the first ACK/NACK information and the second ACK/NACK information included in the AUL-DFI. When the first data includes only one transport block and the second data includes a plurality of transport blocks, the second ACK/NACK information is ACK if ACK/NACK for at least one of the plurality of transport blocks is ACK and the second ACK/NACK information is NACK if ACK/NACKs for all of the plurality of transport blocks are all NACKs.

In still another aspect, provided is a user equipment (UE). The UE includes a transceiver for transmitting and receiving a radio signal and a processor operating in connection with the transceiver. The processor is configured to: transmit first data based on an autonomous uplink (AUL) transmission to a base station, transmit second data based on a grant-based uplink transmission to the base station, receive first acknowledgement/negative acknowledgement (ACK/NACK) information for the first data and second ACK/NACK information for the second data through an AUL-downlink feedback indication (AUL-DFI), and adjust the contention window size based on at least one of the first ACK/NACK information and the second ACK/NACK information included in the AUL-DFI. When the first data includes only one transport block and the second data includes a plurality of transport blocks, the second ACK/NACK information is ACK if ACK/NACK for at least one of the plurality of transport blocks is ACK and the second ACK/NACK information is NACK if ACK/NACKs for all of the plurality of transport blocks are all NACKs.

A method of transmitting data by a UE in an unlicensed band may include scheduled uplink (SUL) transmission for transmitting data on the basis of a UL grant and autonomous uplink (AUL) transmission for transmitting data without a UL grant. These two methods may be interchangeably used in different subframes and an eNB can transmit ACK/NACK for data received through the two methods to a UE through AUL-DFI (downlink feedback indication). For example, ACK/NACK can be transmitted in AUL-DFI through a bitmap field and each bit of the bitmap field can indicate ACK/NACK for each UL HARQ process. The number of bits of the bitmap field can be determined according to AUL transmission mode. Meanwhile, since transmission opportunity is limited in unlicensed bands, the bitmap field can also include ACK/NACK for a (SUL) HARQ process which is not set to AUL. Here, when the HARQ process according to SUL includes a plurality of transport blocks (codewords), ACK/NACK signals corresponding thereto can be spatially bundled and included in a corresponding bit of the bitmap field. Here, spatial bundling for the ACK/NACK signals through a logical OR operation is performed in the present invention. Accordingly, when probability of decoding failure is high due to simultaneous transmission of a node using a different radio access technology such as Wi-Fi (that is, when NACK is generated for all of a plurality of transport blocks according to SUL), NACK can be fed back as a spatial bundling result to increase a contention window size of a UE, thereby reducing probability of collision with the other node during LBT for the next transmission. Further, when probability of decoding failure is high for a reason other than simultaneous transmission of another node (that is, when NACK is generated for only some of a plurality of transport blocks according to SUL), ACK is fed back to reset the contention window size of the UE to a minimum value such that a penalty is not imposed on LBT for the next transmission. Through this method, data transmission in unlicensed bands can be effectively performed.

DESCRIPTION OF EXEMPLARY EMBODIMENTS

Figure 1:
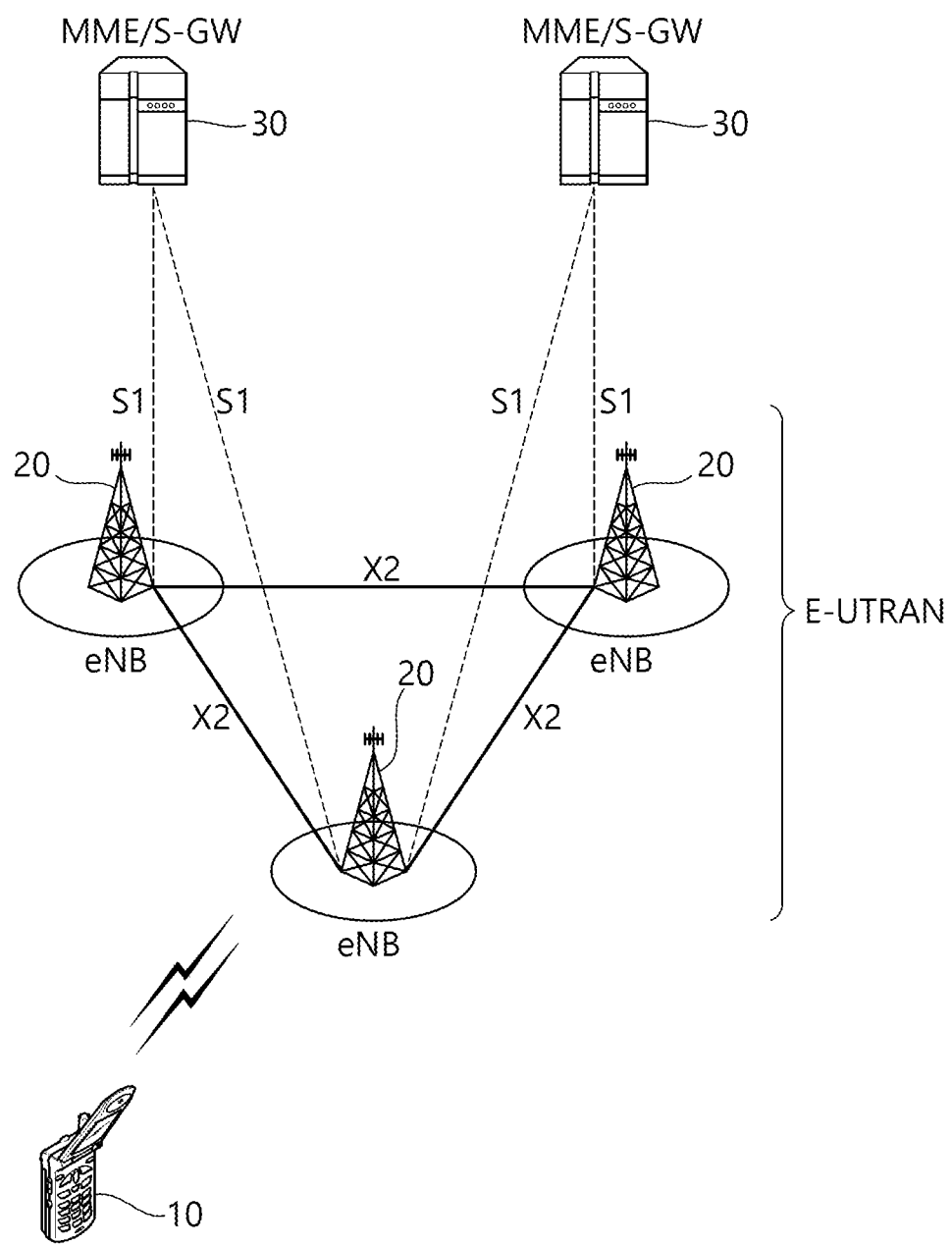
FIG. 1 shows a wireless communication system to which the present invention may be applied.

FIG. 1 shows a wireless communication system to which the present invention may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
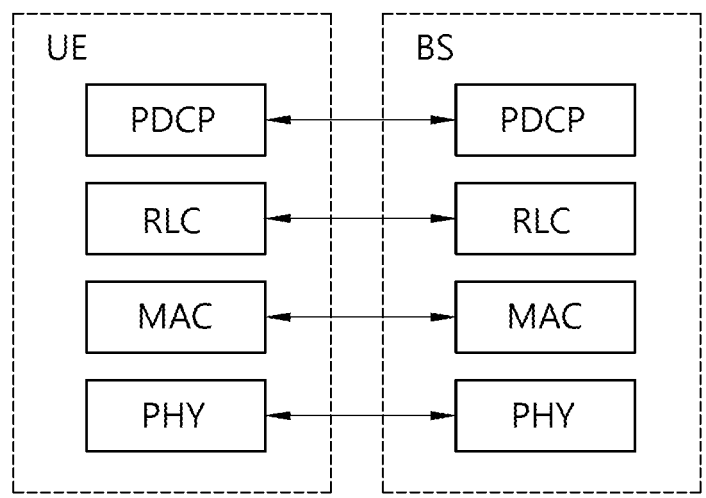
FIG. 2 is a diagram showing a wireless protocol architecture for a user plane.
Figure 3:
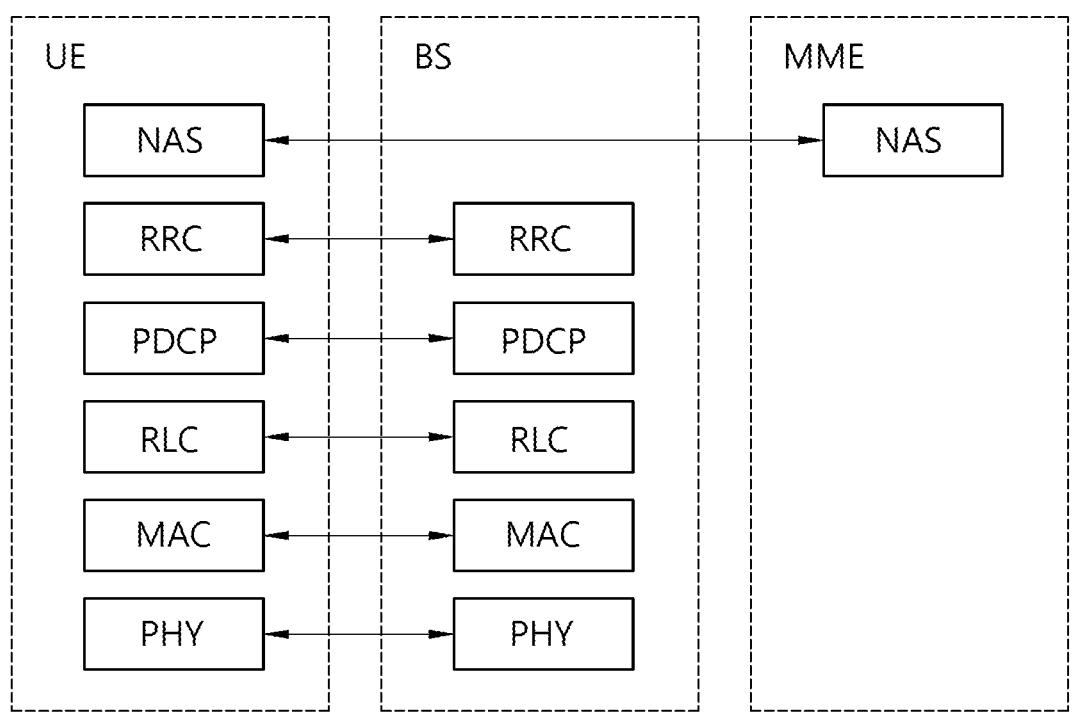
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present invention for convenience.

Figure 4:
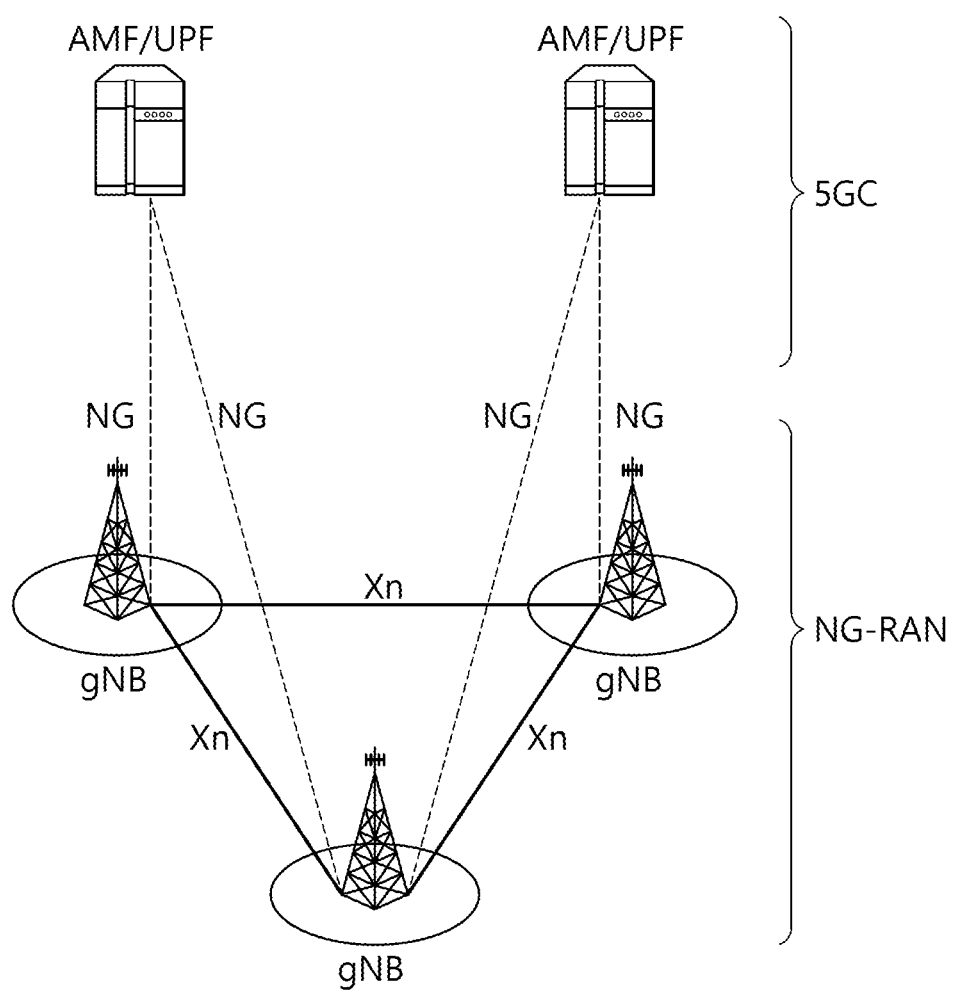
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
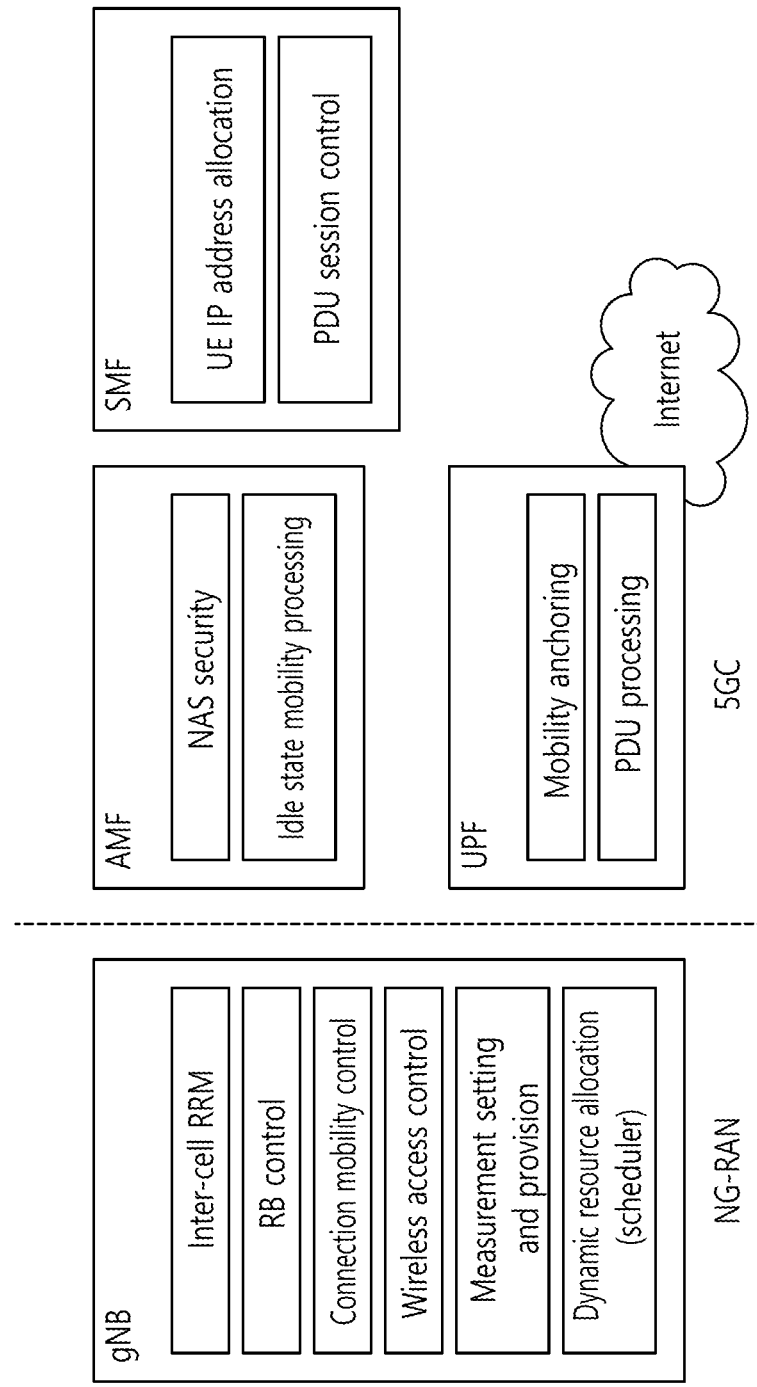
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
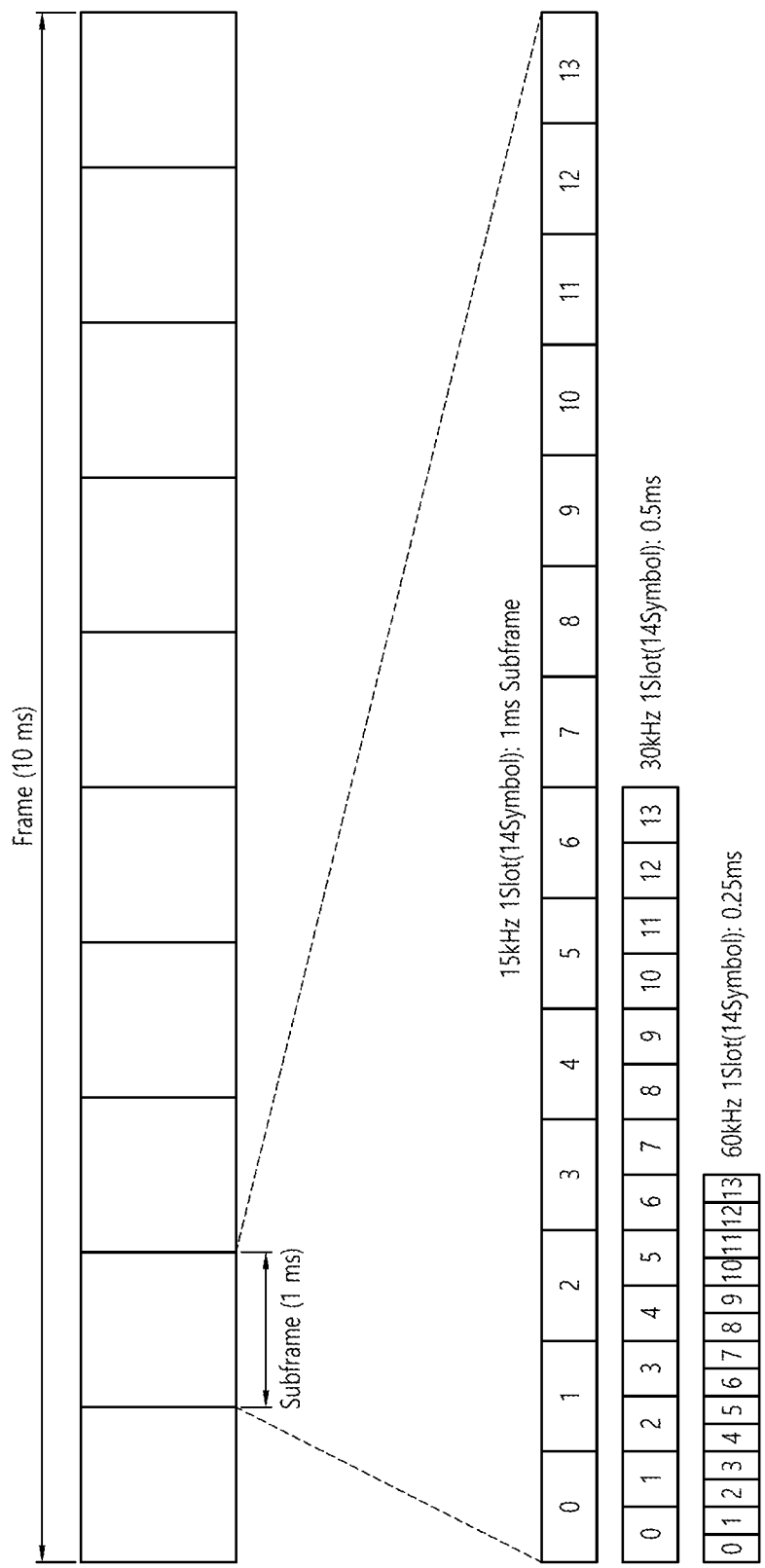
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration μ.

TABLE 1

| μ | Δf = $2^μ · 15$ [kHz] | Cyclic prefix |
|---|---|---|
| 0 | 15 | Normal |
| 1 | 30 | Normal |
| 2 | 60 | Normal<br>Extended |

TABLE 1-continued

| μ | Δf = $2^μ · 15$ [kHz] | Cyclic prefix |
|---|---|---|
| 3 | 120 | normal |
| 4 | 240 | normal |

The following table 2 illustrates the number of slots in a frame ($N^{frame,μ}_{slot}$), the number of slots in a subframe ($N^{subframe,μ}_{slot}$), the number of symbols in a slot ($N^{slot}_{symb}$), and the like, according to subcarrier spacing configurations μ.

TABLE 2

| μ | $N^{slot}_{symb}$ | $N^{frame,μ}_{slot}$ | $N^{subframe,μ}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, μ=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
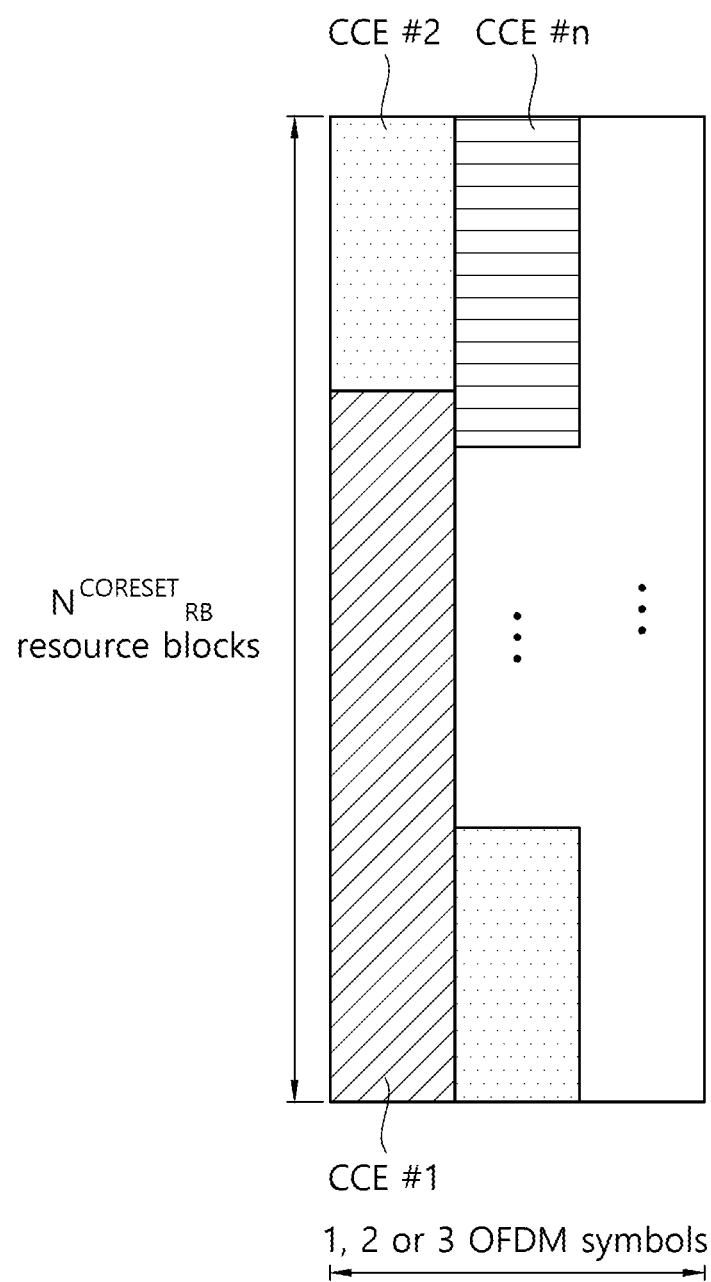
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal.

Figure 8:
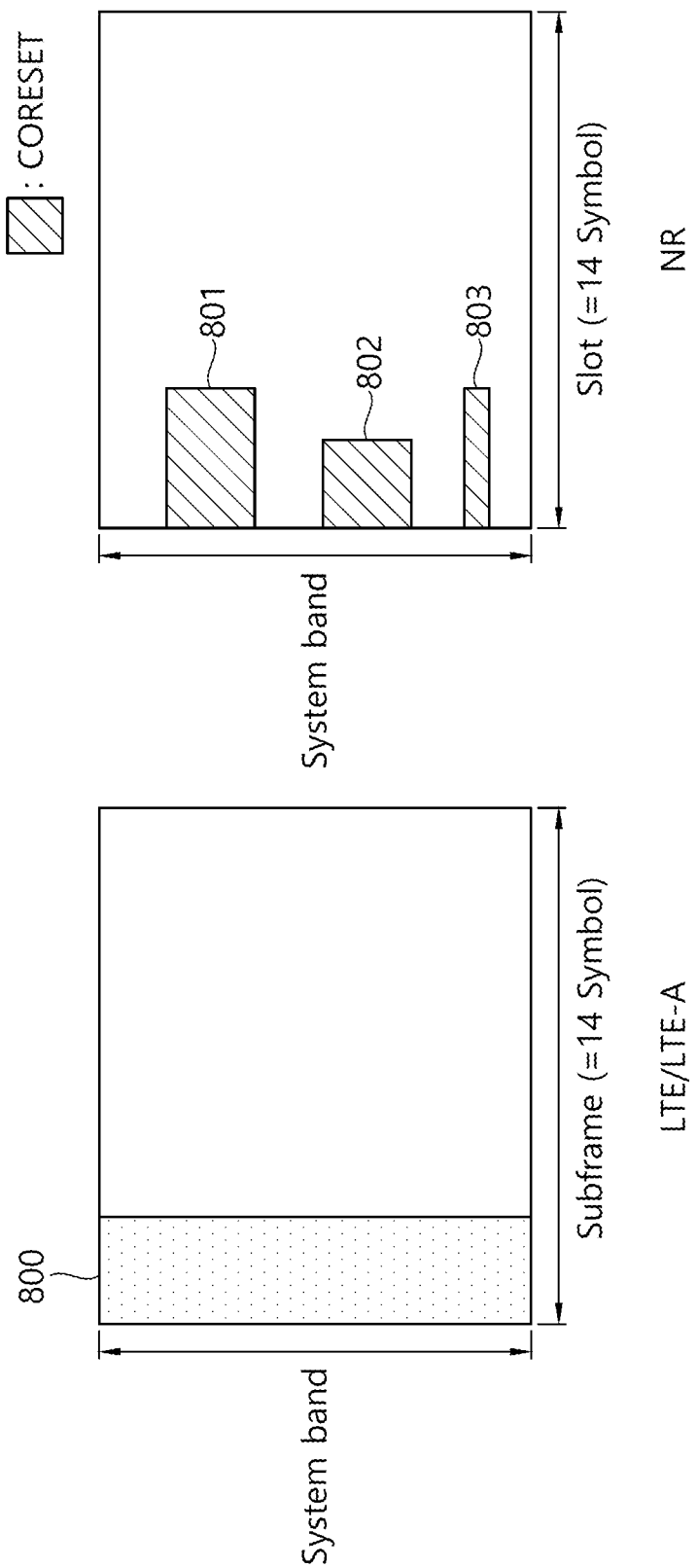
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
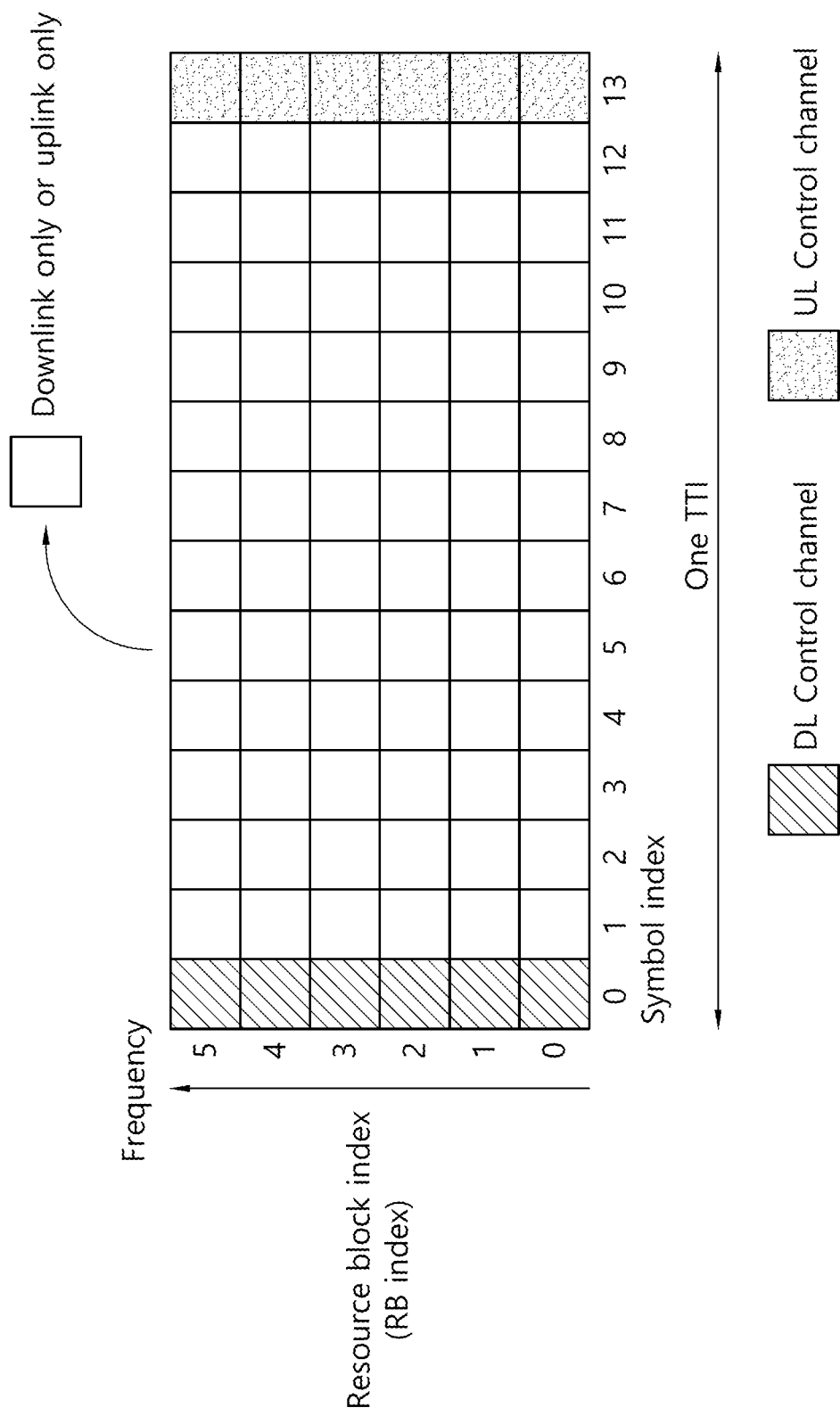
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D) converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
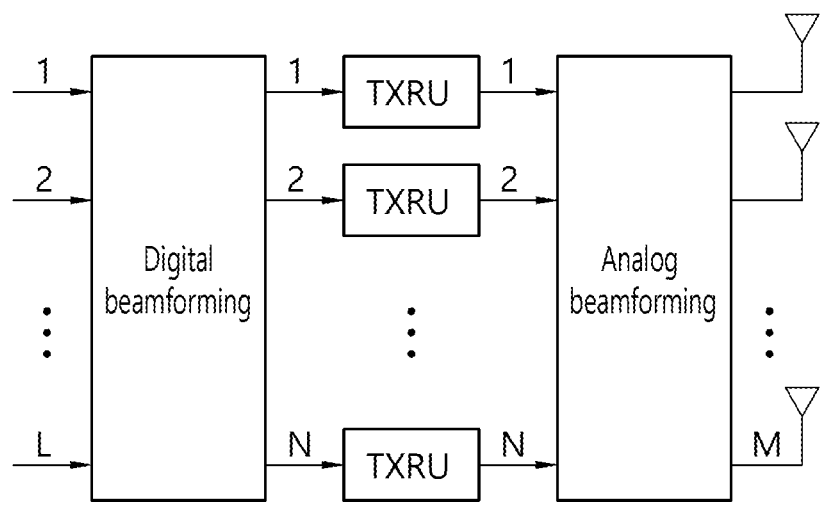
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 7, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
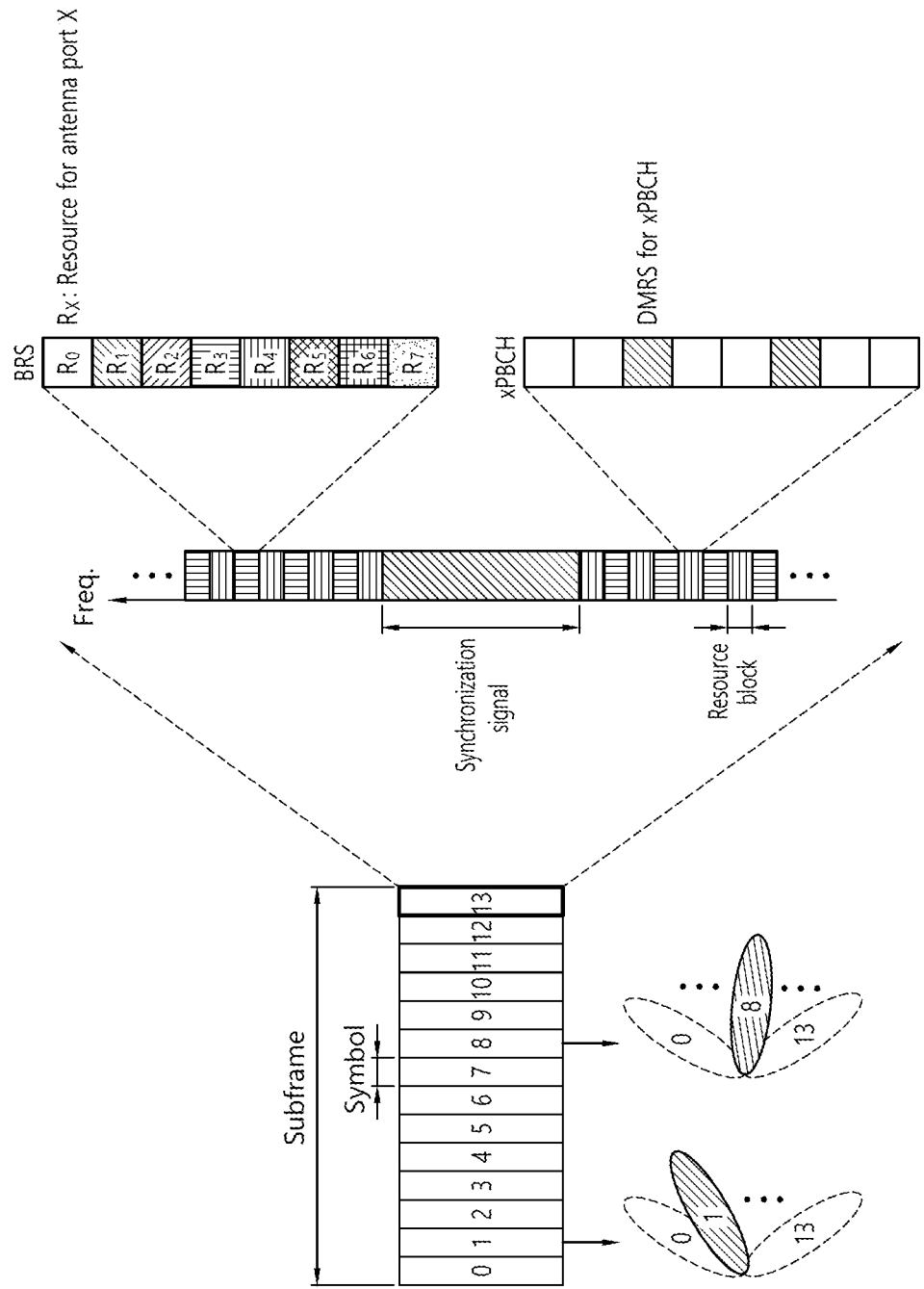
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

<Bandwidth Part (BWP)>

In the NR system, a maximum of 400 MHz can be supported per component carrier (CC). If a UE operating in such a wideband CC operates with RF for all CCs turn on all the time, UE battery consumption may increase. Otherwise, considering use cases operating in one wideband CC (e.g., eMBB, URLLC, mMTC, etc.), different numerologies (e.g., subcarrier spacings (SCSs)) can be supported for different frequency bands in the CC. Otherwise, UEs may have different capabilities for a maximum bandwidth. In consideration of this, an eNB may instruct a UE to operate only in a part of the entire bandwidth of a wideband CC, and the part of the bandwidth is defined as a bandwidth part (BWP) for convenience. ABWP can be composed of resource blocks (RBs) consecutive on the frequency axis and can correspond to one numerology (e.g., a subcarrier spacing, a cyclic prefix (CP) length, a slot/mini-slot duration, or the like).

Further, the eNB can configure a plurality of BWPs for a UE even within one CC. For example, a BWP occupying a relatively small frequency domain can be set in a PDCCH monitoring slot and a PDSCH indicated by a PDCCH can be scheduled on a BWP wider than the BWP. When UEs converge on a specific BWP, some UEs may be set to other BWPs for load balancing. Otherwise, BWPs on both sides of a bandwidth other than some spectra at the center of the bandwidth may be configured in the same slot in consideration of frequency domain inter-cell interference cancellation between neighbor cells. That is, the eNB can configure at least one DL/UL BWP for a UE associated with(=related with) a wideband CC and activate at least one of DL/UL BWPs configured at a specific time (through L1 signaling or MAC CE or RRC signaling), and switching to other configured DL/UL BWPs may be indicated (through L1 signaling or MAC CE or RRC signaling) or switching to a determined DL/UL BWP may occur when a timer value expires on the basis of a timer. Here, an activated DL/UL BWP is defined as an active DL/UL BWP. However, a UE may not receive a configuration for a DL/UL BWP when the UE is in an initial access procedure or RRC connection is not set up. In such a situation, a DL/UL BWP assumed by the UE is defined as an initial active DL/UL BWP.

Hereinafter, a channel access procedure according to LAA (Licensed-Assisted Access) will be described.

First, a downlink channel access procedure will be described.

An eNB operating with LAA SCell(s) needs to perform the following channel access procedure to access channels on which transmission(s) of LSS SCell(s) are performed.

Hereinafter, a channel access procedure for transmission(s) including a PDSCH/PDCCH/EPDCCH will be described.

When a channel in an idle state is sensed first for a slot duration of a defer duration $T_d$ and a counter N is 0 in step 4, the eNB can perform transmission including PDSCH/PDCCH/EPDCCH on a carrier on which transmission(s) of LAA SCell(s) are performed. The counter N is adjusted by sensing a channel additional slot duration(s) according to the steps below.

1) N is set to N=$N_{init}$. Here, $N_{init}$ is an arbitrary number uniformly distributed between 0 and $CW_p$. Then, the procedure proceeds to step 4.

2) If N>0 and the eNB selects decreasing of the counter, N=N−1 is set.

3) When a channel with respect to an additional slot duration is sensed and the additional slot duration is idle, the procedure proceeds to step 4. If not, the procedure proceeds to step 5.

4) The procedure ends if N=0 and proceeds to step 2 if not.

5) The channel is sensed until a busy slot is detected within the additional defer duration $T_d$ or all slots of the additional defer duration $T_d$ are sensed as being idle.

6) If it is sensed that the channel is idle in all slot durations of the additional defer duration $T_d$, the procedure proceeds to step 4. If not, the procedure proceeds to step 5.

When the eNB has not perform transmission including PDSCH/PDCCH/EPDCCH on a carrier on which transmission(s) of LAA SCell(s) are performed after step 4 of the procedure, if the eNB is ready to transmit the PDSCH/PDCCH/EPDCCH, the eNB can perform transmission including PDSCH/PDCCH/EPDCCH on the carrier when it is sensed that the channel is idle in at least a slot duration $T_{sl}$ and the channel is idle in all slot durations of the defer duration $T_d$ immediately before the transmission. When the eNB senses that the channel is not idle in the slot duration $T_{sl}$ or senses that the channel is not idle in arbitrary slot durations of the defer duration $T_d$ immediately before intended transmission when the eNB initially senses the channel after the eNB is ready to perform transmission, the eNB senses that the channel is idle in slot durations of the defer duration $T_d$ and then proceeds to step 1.

The defer duration $T_d$ is configured as a duration of $T_f$=16 s immediately after consecutive slot durations $m_p$. Here, each slot duration is $T_{sl}$=9 µs and $T_f$ includes an idle slot duration $T_{sl}$ at the start point of $T_f$.

The slot duration $T_{sl}$ is considered to be idle (that is, available) if the eNB senses the channel in the slot duration and power detected by the eNB for at least 4 µs within the slot duration is less than an energy detection threshold $X_{Thresh}$. If not, the slot duration $T_{sl}$ is considered to be busy (unavailable).

$CW_p$ ($CW_{min,p} \leq CW_p \leq CW_{max,p}$) is a contention window. Adjustment of $CW_p$ will be described in a contention window adjustment procedure.

$CW_{min,p}$ and $CW_{max,p}$ are selected before step 1 of the above-described procedure.

As shown in Table 4, $m_p$, $CW_{min,p}$ and $CW_{max,p}$ are based on a channel access priority class associated with NB transmission.

If N>0 in the aforementioned procedure, when the eNB transmits a discovery signal that does not include a PDSCH/PDCCH/EPDCCH, the eNB should not reduce N in slot duration(s) overlapping with discovery signal transmission.

The eNB should not perform continuous transmission on a carrier on which transmission(s) of LAA SCell(s) are performed for a duration that exceeds $T_{mcot,p}$ given in Table 4.

If absence of other technologies sharing carriers can be ensured in the long term (for example, according to a level of regulation) for p=3 and p=4, $T_{mcot,p}$=10 ms. If not, $T_{mcot,p}$=8 ms.

Table 4 shows a channel access priority class.

TABLE 4

| Channel access priority class (p) | $m_p$ | $CW_{min,p}$ | $CW_{max,p}$ | $T_{mcot,p}$ | Permitted $CW_p$ size |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Hereinafter, a channel access procedure for transmissions including discovery signal transmission(s) without a PDSCH will be described.

An eNB can transmit a discovery signal without a PDSCH on a carrier on which transmission(s) of LAA SCell(s) are performed if a transmission duration is less than 1 ms immediately after sensing that a channel is idle for at least a sensing interval of $T_{drs}$=25 μs. $T_{drs}$ is configured as $T_f$=16 μs immediately after one slot duration $T_{sl}$=9 μs and $T_f$ includes the idle slot duration $T_{sl}$ at the start point of $T_f$. If it is sensed that the channel is idle for slot durations of $T_{drs}$, the channel is considered to be idle for $T_{drs}$.

Hereinafter, a contention window adjustment procedure will be described.

If an eNB performs transmissions including a PDSCH associated with a channel access priority class p on a carrier, the eNB maintains a contention window value $CW_p$ and adjusts $CW_p$ for transmissions using the following steps prior to step 1 of the above-described procedure.

1) For all priority classes p∈{1, 2, 3, 4}, $CW_p$=$CW_{min,p}$ is set.

2) If at least Z=80% of HARQ-ACK values corresponding to PDSCH transmission(s) is determined to be NACK in a reference subframe k, the procedure increases $CW_p$ to a next highest permitted value for all priority classes p∈{1, 2, 3, 4} and remains in step 2. If not, the procedure proceeds to step 1.

The reference subframe k is a subframe in which most recent transmission performed by an eNB on a carrier expected to be available for at least some HARQ-ACK feedbacks starts.

The eNB needs to adjust the value of $CW_p$ for all priority classes p∈{1, 2, 3, 4} only once on the basis of the given reference subframe k.

If $CW_p$=$CW_{max,p}$, the next highest permitted value $CW_{max,p}$ for $CW_p$ adjustment.

When Z is determined,

If eNB transmission(s) available for HARQ-ACK feedback start at the second slot of the subframe k, HARQ-ACK values corresponding to PDSCH transmission(s) in a subframe k+1 can also be used by being added to HARQ-ACK values corresponding to PDSCH transmission(s) in the subframe k.

If HARQ-ACK values correspond to PDSCH transmission(s) on an LAA SCell allocated according to an (E)PDCCH transmitted on the same LAA SCell,
  if the eNB has not detected HARQ-ACK feedback for PDSCH transmission or the eNB detects "DTX", "NACK/DTX" or "any" state, it is computed as NACK.

If HARQ-ACK values correspond to PDSCH transmission(s) on an LAA SCell allocated according to an (E)PDCCH transmitted on another serving cell,
  if HARQ-ACK feedback for PDSCH transmission is detected by the eNB, "NACK/DTX" or "any" state is computed as NACK and "DTX" state is ignored.
  If HARQ-ACK feedback for PDSCH transmission is not detected by the eNB,
    if PUCCH format 1b using channel selection is expected to be used by a UE, "NACK/DTX" state corresponding to "no transmission" is computed as NACK and "DTX" state corresponding to "no transmission" is ignored. If not, HARQ-ACK for PDSCH transmission is ignored.

If PDSCH transmission has two codewords, a HARQ-ACK value of each codeword is separately considered.

Bundled HARQ-ACK over M subframes is considered as M HARQ-ACK responses.

If the eNB performs transmission that includes a PDCCH/EPDCCH having DCI format 0A/0B/4A/4B and does not include a PDSCH associated with channel access priority class p on a channel starting at a time $t_0$, the eNB maintains the contention window value $CW_p$ and, adjusts $CW_p$ for transmissions using the following steps prior to step 1 of the above-described procedure.

1) For all priority classes p∈{1, 2, 3, 4}, $CW_p$=$CW_{min,p}$ is set.

2) When 10% or less of UL transport blocks scheduled by the eNB has been successfully received using type-2 channel access procedure within an interval from $t_0$ to $t_0+T_{CO}$, the procedure increases $CW_p$ to a next highest permitted value for all priority classes p∈{1, 2, 3, 4} and remains in step 2. If not, the procedure proceeds to step 1.

If $CW_p$=$CW_{max,p}$ is consecutively used K times for generation of $N_{init}$, $CW_p$ is reset to $CW_{min,p}$ only for a priority class p at which $CW_p$=$CW_{max,p}$ is consecutively used K times for generation of $N_{init}$. K is selected by the eNB from a set of values of {1, 2, . . . , 8} for each of priority classes p∈{1, 2, 3, 4}.

Hereinafter, an energy detection threshold adaptation procedure will be described.

An eNB which is accessing a carrier on which transmission(s) of LAA SCell(s) are performed needs to set the energy detection threshold $X_{Thresh}$ to be equal to or less than a maximum energy detection threshold $X_{Thres\_max}$.

$X_{Thresh\_max}$ is determined as described later.

If absence of other technologies sharing carriers can be ensured in the long term (for example, according to a level of regulation),
  $X_{Thresh\_max}$=min{$T_{max}$+10 dB, $X_r$}.
  $X_r$ is a maximum energy detection threshold defined in dB according to regulatory requirements when the regulatory requirements are defined. If not, $X_r$=$T_{max}$+10 dB.

If not,
  $X_{Thresh\_max}$=max{−72+10*log 10(BWMHz/20 Mhz) dBm, min{$T_{max}$, $T_{max}$−$T_A$+($P_H$+10*log 10(BWMHz/20 MHz)−$P_{TX}$)}}.

Here,
  $T_A$=10 dB for transmission(s) including a PDSCH.
  $T_A$=5 dB for transmissions including discovery signal transmission(s) without a PDSCH.
  $P_H$=23 dBm.
  PTX is the set maximum eNB output power in dBm with respect to a carrier.

An eNB uses the maximum transmission power set with respect to a single carrier irrespective of whether a single carrier transmission or multi-carrier transmission is used.

$T_{max}$(dBm)=10*log 10(3.16228*10$^{-8}$ (mW/MHz) *BWMHz (MHz)).

BWMHz is a single carrier bandwidth in MHz.

Hereinafter, a channel access procedure for transmission(s) on a plurality of carriers.

An eNB can access a plurality of carriers on which transmission(s) of LAA SCells are performed according to one of type-A and type-B procedures described later.

Hereinafter, a type-A multi-carrier access procedure will be described.

An eNB needs to perform channel access on each carrier $c_i \in C$ according to the aforementioned channel access procedure for transmission(s) including a PDSCH/PDCCH/EPDCCH. Here, C is a set of carriers intended to be transmitted by the eNB, i=0, 1, . . . , q−1, and q is the number of carriers intended to be transmitted by the eNB.

The counter N described in the aforementioned channel access procedure for transmission(s) including a DSCH/PDCCH/EPDCCH is determined for each carrier $c_i$(c_i) and represented as $N_{c\_i}$. $N_{c\_i}$ is maintained in type A1 or type A2.

Hereinafter, type A1 will be described.

The counter N described in the aforementioned channel access procedure for transmission(s) including a DSCH/PDCCH/EPDCCH is determined for each carrier $c_i$ and represented as $N_{c\_i}$.

If absence of other technologies sharing carriers is not ensured in the long term (for example, according to a level of regulation), when the eNB stops transmission on any one carrier $c_j \in C$, the eNB can resume $N_{c\_i}$ reduction for each carrier $c_i \neq c_j$ after idle slots are sensed after waiting for a duration of $4T_{sl}$ or after $N_{c\_i}$ is reinitialized.

Hereinafter, type A2 will be described.

The counter N described in the aforementioned channel access procedure for transmission(s) including a DSCH/PDCCH/EPDCCH is determined for a carrier $c_j \in C$ and represented as $N_{c\_j}$. Here, $c_j$ is a carrier having a largest $CW_p$ value. For each carrier $c_i$, $N_{c\_i} = N_{c\_j}$. When the eNB stops transmission on any one carrier for which $N_{c\_i}$ has been determined, the eNB needs to reinitialize $N_{c\_i}$ for all carriers.

Hereinafter, a type-B multi-carrier access procedure will be described.

A carrier $c_j \in C$ is selected by an eNB as follows.

The eNB uniformly randomly selects $c_j$ from C prior to respective transmissions on a plurality of carriers $c_i \in C$, or the eNB does not select $c_j$ more than once per second.

Here, C is a set of carriers intended to be transmitted by the eNB, i is 0, 1, . . . , q−1, and q is the number of carriers intended to be transmitted by the eNB.

For transmission on a carrier $c_j$, the eNB needs to perform channel access on a carrier $c_j$ according to the aforementioned channel access procedure including a PDSCH/PDCCH/EPDCCH having a modification for type B1 or type B described below.

For transmission on a carrier corresponding to $c_i \in C$ and $c_i \neq c_j$, for each carrier $c_i$, the eNB needs to sense the carrier $c_i$ for at least the sensing interval $T_{mc}$=25 μs immediately before transmission on the carrier $c_j$ and the eNB can perform transmission on the carrier $c_i$ immediately after sensing that the carrier $c_i$ is idle for at least the sensing interval $T_{mc}$. The carrier $c_i$ is considered to be idle for $T_{mc}$ if it is sensed that a channel is idle for all time intervals in which idle sensing is performed on the carrier $c_j$ within the given interval $T_{mc}$.

The eNB should not continuously perform transmission on a carrier corresponding to $c_i \in C$, $c_i \neq c_j$ for a period that exceeds $T_{mcot,p}$ given in Table 4. Here, the value of $T_{mcot,p}$ is determined using a channel access parameter used for carriers $c_j$.

Hereinafter, type B1 will be described.

A single $CW_p$ value is maintained for a set C of carriers

When $CW_p$ is determined for channel access on a carrier $c_j$, step 2 described in the contention window adjustment procedure is modified as follows.

If at least Z=80% of HARQ-ACK values corresponding to PDSCH transmission(s) in reference subframes k of all carriers $c_i \in C$ is determined to be NACK, the procedure increases $CW_p$ to a next highest permitted value for respective priority classes p∈{1, 2, 3, 4}. If not, the procedure proceeds to step 1.

Hereinafter, type B2 will be described.

$CW_p$ is independently maintained for each carrier $c_i \in C$ using the aforementioned contention window adjustment procedure.

When $N_{init}$ is determined for carriers $c_j$, the value of $CW_p$ of a carrier $c_{j1} \in C$ is used. Here, $c_{j1}$ is a carrier having a largest $CW_p$ value among all carriers in the set C.

Hereinafter, an uplink channel access procedure will be described.

A UE and an eNB which schedules uplink transmission(s) for the UE need to perform the following procedures to access channel(s) on which transmission(s) of LAA SCell(s) are performed for the UE.

Hereinafter, a channel access procedure for uplink transmission(s) will be described.

A UE can access a carrier on which uplink transmission(s) of LAA SCell(s) are performed according to one of type-1 and type-2 uplink channel access procedures.

If an uplink grant that schedules PUSCH transmission indicates the type-1 channel access procedure, the UE needs to use the type-1 channel access procedure in order to perform transmissions including PUSCH transmission unless otherwise described.

If the uplink grant that schedules PUSCH transmission indicates the type-2 channel access procedure, the UE needs to use the type-2 channel access procedure in order to perform transmissions including PUSCH transmission unless otherwise described.

The UE needs to use the type-1 channel access procedure when the UE performs SRS transmissions including no PUSCH transmission. An uplink channel access priority class p=1 is used for SRS transmissions including no PUSCH.

Table 5 shows a channel access priority class for uplink.

TABLE 5

| Channel access priority class (p) | $m_p$ | $CW_{min,p}$ | $CW_{max,p}$ | $T_{ulmcot,p}$ | Permitted $CW_p$ value |
|---|---|---|---|---|---|
| 1 | 2 | 3 | 7 | 2 ms | {3, 7} |
| 2 | 2 | 7 | 15 | 3 ms | {7, 15} |

TABLE 5-continued

| Channel access priority class (p) | $m_p$ | $CW_{min,p}$ | $CW_{max,p}$ | $T_{ulmcot,p}$ | Permitted $CW_p$ value |
|---|---|---|---|---|---|
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

Note 1:
$T_{ulmcot,p}$ = 10 ms if higher layer parameter 'absenceOfAnyOtherTechnology-r14' indicates TRUE for p = 3, 4 and $T_{ulmcot,p}$ = 6 ms if not.
Note 2:
When $T_{ulmcot,p}$ = 6 ms, this can be increased to 8 ms by inserting one or more gaps. A minimum gap duration must be 100 μs. A maximum duration before insertion of any gap must be 6 ms.

When "UL configuration for LAA" field configures "UL offset" 1 and "UL duration" d for a subframe n, if end of UE transmission occurs within or before a subframe n+l+d−1, the UE can use channel access type 2 for transmissions within a subframe n+l+i irrespective of channel access type signaled by an uplink grant for such subframes, and i=0, 1, . . . , d−1.

When the UE has scheduled transmissions including a PUSCH in a set of subframes $n_0, n_1, \ldots, n_{w-1}$ using PDCCH DCI format 0B/4B and has not accessed a channel for transmission in a subframe $n_k$, the UE needs to attempt transmission in a subframe $n_{k+1}$ according to a channel access type indicated in DCI. Here, k∈{0, 1, . . . , w−2} and w is the number of scheduled subframes indicated in the DCI.

If the UE is scheduled to perform transmissions which do not have gaps including a PUSCH in the set of subframes $n_0$, $n_1, \ldots, n_{w-1}$ using one or more PDCCH DCI formats 0A/0B/4A/4B and performs transmission in a subframe $n_k$ after accessing a carrier according to one of the type-1 and type-2 uplink channel access procedures, the UE can continue transmission in subframes after $n_k$. Here, k∈{0, 1, . . . , w−1}.

If the start of UE transmission in a subframe n+1 is immediately after the end of UE transmission in a subframe n, the UE does not expect indication of different channel access types for transmissions in such subframes.

When the UE is scheduled to perform transmission without a gap in subframes $n_0, n_1, \ldots, n_{w-1}$ using one or more PDCCH DCI formats 0A/0B/4A/4B, has stopped transmission for or before a subframe $n_{k1}$ for which k1∈{0, 1, . . . , w−2}, and senses that a channel is continuously idle after transmission has been stopped, the UE can perform transmission in the following subframe $n_{k2}$ for which k2∈{1, . . . , w−1}) using the type-2 channel access procedure. If the channel sensed by the UE is not continuously idle after the UE stops transmission, the UE can perform transmission in the following subframe $n_{k2}$ for which k2∈{1, . . . , w−1} using a type-1 channel access procedure having an uplink channel access priority class indicated in DCI corresponding to the subframe $n_{k2}$.

If the UE receives a UL grant, DCI indicates PUSCH transmission which starts in a subframe n using a type-1 channel access procedure and the UE has an ongoing type-1 channel access procedure before the subframe n, If an uplink channel access priority class value $p_1$ used for the continuous type-1 channel access procedure is equal to or greater than an uplink channel access priority class value $p_2$ indicated by DCI, the UE can perform PUSCH transmission in response to the UL grant by accessing a carrier using the continuous type-1 channel access procedure.

If the uplink channel access priority class value $p_1$ used for the continuous type-1 channel access procedure is less than the uplink channel access priority class value $p_2$ indicated by the DCI, the UE needs to end the continuous channel access procedure.

If the UE is scheduled to perform transmission on the set C of carriers in the subframe n, UL grants which schedule PUSCH transmissions on the set C of carriers indicate the type-1 channel access procedure, the same "PUSCH starting position" is indicated by all carriers in the set C of carriers, and carrier frequencies of the set C of carriers are a subset of predefined sets of carrier frequencies, the UE can perform transmission on a carrier $c_i$∈C using the type-2 channel access procedure in the following case.

If the type-2 channel access procedure is performed on the carrier $c_i$ immediately before UE transmission on a carrier corresponding to $c_j$∈C, i≠j and when the UE has accessed a carrier $c_j$ using the type-1 channel access procedure, here, the carrier $c_j$ is uniformly randomly selected by the UE from the set C of carriers before the type-1 channel access procedure is performed on any carrier in the set C of carriers.

When an eNB has performed transmission on a carrier according to a channel access procedure for transmission(s) including a PDSCH/PDCCH/EPDCCH, the eNB can indicate the type-2 channel access procedure in DCI of a UL grant which schedules transmission(s) including a PUSCH on a carrier in the subframe n. Alternatively, when the eNB has performed transmission on a carrier according to the channel access procedure for transmission(s) including a PDSCH/PDCCH/EPDCCH, the eNB can indicate that the type-2 channel access procedure for transmission(s) including a PUSCH on a carrier can be performed in the subframe n using "UL configuration for LAA" field. Alternatively, when the subframe n is generated within a time interval that starts at to and ends at $t_0+T_{CO}$, the eNB can schedule transmissions including a PUSCH on a carrier in the subframe n, which follow transmission by the eNB on a carrier having a duration of $T_{short\_ul}$=25 μs. Here, $T_{CO}=T_{mcot,p}+T_g$, $t_0$ is a time instance at which an eNB starts transmission, the value of $T_{mcot,p}$ is determined by an eNB as described in the downlink channel access procedure, $T_g$ is a total time interval of gaps of all durations which exceed 25 μs generated between downlink transmission of an eNB and uplink transmission scheduled by the eNB and between arbitrary two uplink transmissions which start at to and are scheduled by the eNB.

If continuous scheduling is possible, the eNB needs to schedule uplink transmissions between $t_0$ and $t_0+T_{CO}$ in consecutive subframes.

For uplink transmission on a carrier which follows transmission by the eNB on a carrier having a duration of $T_{short\_ul}$=25 μs, the UE can use the type-2 channel access procedure.

If the eNB indicates the type-2 channel access procedure for the UE in DCI, the eNB indicates a channel access priority class used to acquire access to a channel in the DCI.

Hereinafter, a type-1 uplink channel access procedure will be described.

The UE can perform transmission using the type-1 channel access procedure after sensing that a channel is idle first for a slot duration of a defer duration $T_d$ and after the counter N is 0 in step 4. The counter N is adjusted by sensing a channel with respect to additional slot duration(s) according to the following steps.

1) $N=N_{init}$ is set. Here, $N_{init}$ is an arbitrary number uniformly distributed between 0 and $CW_p$. Then, the procedure proceeds to step 4.

2) If N>0 and the eNB selects decrease of the counter, N=N−1 is set.

3) If a channel with respect to an additional slot duration is sensed and the additional slot duration is idle, the procedure proceeds to step 4. If not, the procedure proceeds to step 5.

4) The procedure ends if N=0 and proceeds to step 2 if not.

5) The channel is sensed until a busy slot is detected within an additional defer duration $T_d$ or it is sensed that all slots of the additional defer duration $T_d$ are idle.

6) If it is sensed that the channel is idle for all slot durations of the additional defer duration $T_d$, the procedure proceeds to step 4. If not, the procedure proceeds to step 5.

When the UE has not performed transmission including PUSCH transmission on a carrier on which transmission(s) of LAA SCell(s) are performed after step 4 of the above-described procedure, the UE can perform transmission including PUSCH transmission on the carrier if it is sensed that a channel is idle in at least the slot duration $T_{sl}$ when the UE is ready to perform transmission including PUSCH transmission and it is sensed that the channel is idle for all slot durations of the defer duration $T_d$ immediately before transmission including PUSCH transmission. If it is not sensed that the channel is idle in the slot duration $T_{sl}$ when the UE has initially sensed the channel after the UE is ready to perform transmission or it is not sensed that the channel is idle for arbitrary slot durations of the defer duration $T_d$ immediately before intended transmission including PUSCH transmission, the UE senses that the channel is idle for slot durations of the defer duration $T_d$ and then proceeds to step 1.

The defer duration $T_d$ is configured as a duration of $T_f$=16 μs immediately after consecutive slot durations $m_p$. Here, each slot duration is $T_{sl}$=9 μs and $T_f$ includes an idle slot duration $T_{sl}$ at the start point of $T_f$.

The slot duration $T_{sl}$ is considered to be idle if the UE senses the channel for the slot duration and power detected by the UE for at least 4 μs in the slot duration is less than the energy detection threshold $X_{Thresh}$. If not, the slot duration $T_{sl}$ is considered to be busy.

$CW_p$ ($CW_{min,p} \leq CW_p \leq CW_{max,p}$) is a contention window. Adjustment of $CW_p$ will be described in the contention window adjustment procedure.

$CW_{min,p}$ and $CW_{max,p}$ are selected before the aforementioned step 1.

$m_p$, $CW_{min,p}$ and $CW_{max,p}$ are based on a channel access priority class signaled to the UE as shown in Table 5.

$X_{Thresh}$ adaptation will be described in an energy detection threshold adaptation procedure which will be described later.

Hereinafter, a type-2 UL channel access procedure will be described.

If an uplink UE uses a type-2 channel access procedure for transmission including PUSCH transmission, the UE can perform transmission including PUSCH transmission immediately after sensing that a channel is idle for at least a sensing interval of $T_{short\_ul}$=25 μs. $T_{short\_ul}$ configured as a duration of $T_f$=16 μs immediately followed by one shot duration of $T_{sl}$=9 μs, and $T_f$ includes an idle slot duration $T_{sl}$ at the start point of $T_f$. If a channel is sensed as being idle for slot durations of $T_{short\_ul}$, the channel is considered to be idle for $T_{short\_ul}$.

Hereinafter, the contention window adjustment procedure will be described.

If a UE performs transmission using the type-1 channel access procedure associated with a channel access priority class p on a carrier, the UE needs to maintain a contention window value $CW_p$ and adjust $CW_p$ for such transmissions before step 1 of the aforementioned type-1 uplink channel access procedure using the following procedures.

If an NDI value with respect to at least one HARQ procedure associated with HARQ_ID_ref is toggled, $CW_p=CW_{min,p}$ is set for all priority classes p∈{1, 2, 3, 4}.

If not, $CW_p$ is increased to a next highest permitted value for all the priority classes p∈{1, 2, 3, 4}.

HARQ_ID_ref is a HARQ process ID of UL-SCH in a reference subframe $n_{ref}$. The reference subframe $n_{ref}$ is determined as follows.

When the UE has received an uplink grant in a subframe $n_g$, a subframe $n_w$ is a most recent subframe prior to a subframe $n_g$−3 in which the UE has transmitted UL-SCH using the type-1 channel access procedure.

If the UE performs transmission which starts in a subframe $n_0$ without gaps and includes UL-SCH in subframes $n_0, n_1, \ldots, n_w$, the reference subframe $n_{ref}$ is the subframe $n_0$, If not, the reference subframe $n_{ref}$ is the subframe $n_w$.

If the UE is scheduled to perform transmissions including PUSCH transmission without gaps in a set of subframes $n_0, n_1, \ldots, n_{w-1}$ using the type-1 channel access procedure and any transmission including PUSCH transmission cannot be performed in the set of subframes, the UE can maintain the value of $CW_p$ without changing the same for all priority classes p∈{1, 2, 3, 4}.

If a reference subframe for finally scheduled transmission is also $n_{ref}$, the UE can maintain the value of $CW_p$ for all priority classes p∈{1, 2, 3, 4} using the type-1 channel access procedure as in finally scheduled transmission including PUSCH transmission.

If $CW_p=CW_{max,p}$, a next highest permitted value for $CW_p$ adjustment is $CW_{max,p}$.

If $CW_p=CW_{max,p}$ is consecutively used K times for generation of $N_{init}$, $CW_p$ is reset to $CW_{min,p}$ only for a priority class p at which $CW_p=CW_{max,p}$ is consecutively used K times for generation of $N_{init}$. K is selected by the UE from a set of values of {1, 2, . . . , 8} for each of the priority classes p∈{1, 2, 3, 4}.

Hereinafter, energy detection threshold adaptation procedure.

A UE which has accessed a carrier on which transmission(s) of LAA SCell(s) are performed needs to set the energy detection threshold $X_{Thresh}$ to below a maximum energy detection threshold $X_{Thresh\_max}$.

$X_{Thresh\_max}$ is determined as follows.

If the UE is configured by higher layer parameter "max-EnergyDetectionThreshold-r14", $X_{Thresh\_max}$ is set to the same value as a value signaled by the higher layer parameter.

If not, the UE needs to determine $X'_{Thresh\_max}$ according to a default maximum energy detection threshold computation procedure which will be described later.

If the UE is configured by higher layer parameter "energyDetectionThresholdOffset-r14", $X_{Thresh\_max}$ is set by applying $X'_{Thresh\_max}$ according to an offset value signaled by the higher layer parameter.

If not, the UE needs to set $X_{Thresh\_max}=X'_{Thresh\_max}$.

Hereinafter, the default maximum energy detection threshold computation procedure will be described.

If higher layer parameter "absenceOfAnyOtherTechnology-r14" indicates "TRUE":

$X'_{Thresh\_max}=\min\{T_{max}+10\text{ dB}, X_r\}$, here, $X_r$ is a maximum energy detection threshold defined in dBm according to regulatory requirements when the regulatory requirements are defined. If not $X_r=T_{max}+10$ dB.

If not, $X'_{Thresh\_max}=\max\{-72+10*\log 10(\text{BWMHz}/20 \text{ MHz})$ dBm, $\min\{T_{max}, T_{max}-T_A+(P_H+10*\log 10(\text{BWMHz}/20 \text{ MHz})-P_{TX})\}\}$ Here, $T_A=10$ dB $P_H=23$ dBm $P_{TX}$ is set to $P_{CMAX\_H,c}$.

$T_{max}(\text{dBm})=10*\log 10(3.16228*10 \text{ (mW/MHz)}*\text{BWMHz (MHz)})$ BWMHz is a single carrier bandwidth in MHz.

The present invention proposes a method of configuring AUL UCI (uplink control information) according to a higher layer signal such as RRC and a MCOT (maximum channel occupancy time) sharing method when a UE transmits data to an eNB through autonomous uplink (AUL) transmission in a wireless communication system composed of the eNB and the UE in an unlicensed band.

As a larger number of communication devices requires larger communication capacity, efficient utilization of limited frequency bands in a next wireless communication system is increasingly required. In cellular communication systems such as LTE/NR systems, methods of using unlicensed bands such as 2.4 GHz mainly used in Wi-Fi system or unlicensed bands such as 5 GHz and 60 GHz which newly attract attention for traffic offloading are under discussion.

Since an unlicensed band is based on the assumption that wireless transmission and reception are performed through contention between communication nodes, it is necessary for each communication node to perform channel sensing before signal transmission to check whether another communication node has not transmitted a signal. This operation is called LBT (Listen before Talk) or a channel access procedure for convenience, and particularly, an operation of checking whether another communication node transmits a signal is defined as carrier sensing (CS) and a case in which it is determined that another communication does not transmit a signal is defined as confirmation of clear channel assessment (CCA).

Figure 12:
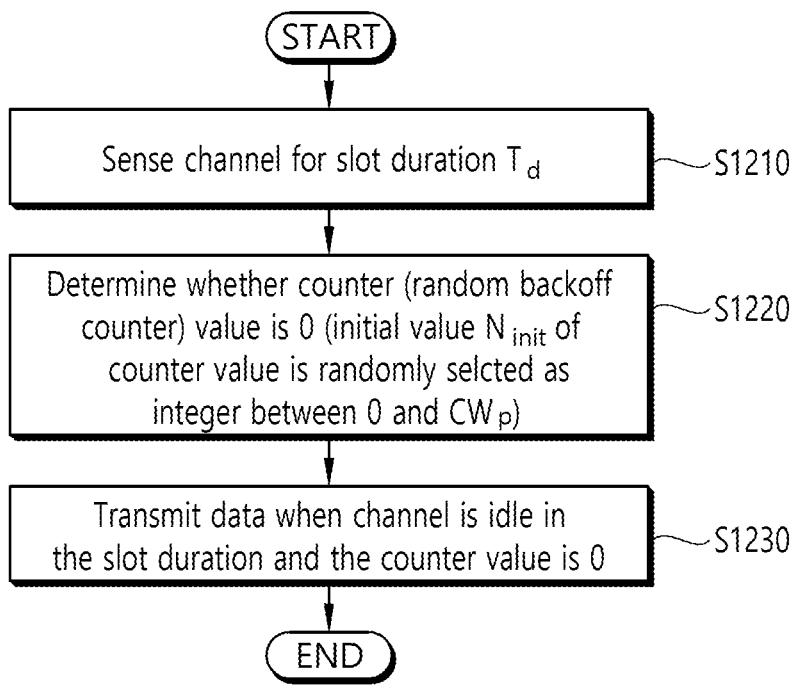
FIG. 12 illustrates a channel access procedure (or LBT).

FIG. 12 illustrates a channel access procedure (or LBT).

Referring to FIG. 12, a UE can perform channel sensing for a slot duration $T_d$ (S1210). The UE determines whether a counter (random back-off counter) value is 0 (S1220). An initial value $N_{init}$ of the counter value can be selected as any integer between 0 and $CW_p$. The UE can transmit data when a channel is idle in the slot duration and the counter value is 0 (S1230).

The procedure of FIG. 12 will be described in more detail. For example, channel sensing for initial channel access can be performed for at least $T_d$ (which may be referred to as a defer duration). If a channel is "idle (that is, available)" for the duration $T_d$ and the random back-off counter value N is 0, the channel is occupied to transmit data. Here, the following procedures can be performed as a procedure for adjusting N.

1) $N=N_{init}$ is set. Here, $N_{init}$ is any integer between 0 and $CW_p$;

2) if N is greater than 0, the UE selects reduction of N;

3) channel sensing is performed for one slot, procedure 4) is performed if a channel is "available" as a sensing result, and procedure 5) is performed if not;

4) the present procedure for channel access ends if N is 0 and procedure 2) is performed if not;

5) a channel is sensed until one slot is detected as "being used" in $T_d$ for additional duration $T_d$ or all slots are detected as "available" in the duration $T_d$;

6) procedure 4) is performed if the channel is sensed as "available" for all slots of the duration $T_d$ as a result of procedure 5) and procedure 5) is performed if not.

As defined in [Table 5] corresponding to a range for selecting $N_{init}$, a minimum value $CW_{min,p}$ and a maximum value $CW_{max,p}$ of CWp that is a current contention window size (CWS) are determined according to a channel access priority class p of data intended to be transmitted, and CWp has a value determined between the minimum value and the maximum value.

In the case of a UE which performs transmission on a certain carrier using the type-1 channel access procedure associated with a channel access priority class p, the UE can adjust a contention window size through the following process.

When the UE has received a UL grant or an AUL-DFI (downlink feedback indicator), if an NDI (new data indicator) field for a corresponding HARQ process is toggled or ACK is received for the corresponding HARQ process, the contention window size can be set to a minimum value for all priority classes. If not (for example, if the NDI field is not toggled or NACK is received for the corresponding HARQ process), the contention window size is increased to a next highest value among values permitted for priority classes in Table 5.

An eNB and a UE of an LTE/NR system need to perform LBT (channel access procedure) for signal transmission in an unlicensed band (hereinafter, which may also be referred to as U-band for convenience), and it may be necessary for other communication nodes such as Wi-Fi nodes not to perform LBT to cause interference when the eNB or the UE of the LTE/NR system transmits a signal. For example, a CCA threshold is defined as −62 dBm for non-Wi-Fi signals and as −82 dBm for Wi-Fi signals in Wi-Fi standard (801.11ac). This may mean that a communication node (a station (STA) or an access point (AP)) does not perform signal transmission such that interference does not occur when a signal other than Wi-Fi signals is received with power of −62 dBm or higher.

Figure 13:
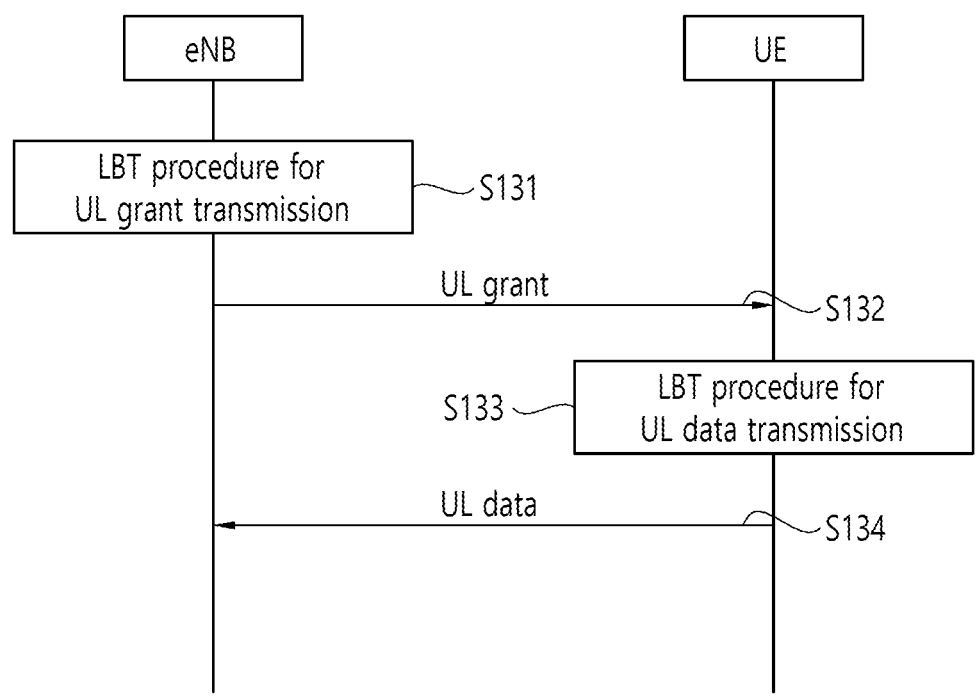
FIG. 13 shows an example of an operation between an eNB and a UE in an unlicensed band.

FIG. 13 shows an example of an operation between an eNB and a UE in an unlicensed band.

Referring to FIG. 13, the eNB performs an LBT procedure (channel access procedure, the same applies in the following) for UL grant transmission (S131). When the LBT procedure is successful (for example, when it is determined that the eNB is allowed to use a channel because the channel is not used by other communication nodes), the eNB transmits a UL grant to the UE (S132).

The UE performs an LBT procedure for UL data transmission (S133). When the LBT procedure is successful, the UE transmits UL data to the eNB (S134). The UL data can be transmitted on the basis of the UL grant. For example, the UL data can be transmitted using resources scheduled from the UL grant.

In this manner, the eNB needs to successfully perform LBT for UL grant transmission on an unlicensed band first and the UE also needs to successfully perform LBT for UL data transmission for uplink data transmission of the UE in the unlicensed band. That is, UL data transmission can be attempted only when two LBT procedures performed by the eNB and the UE have been successfully performed.

Further, a delay of a minimum of 4 msec is required between a UL grant and UL data scheduled from the UL grant in the LTE system. When another transmission node coexisting in the unlicensed band preferentially performs access during this delay time, the scheduled UL data transmission may be delayed. For this reason, a method of improving the efficiency of UL data transmission in an unlicensed band is under discussion.

Figure 14:
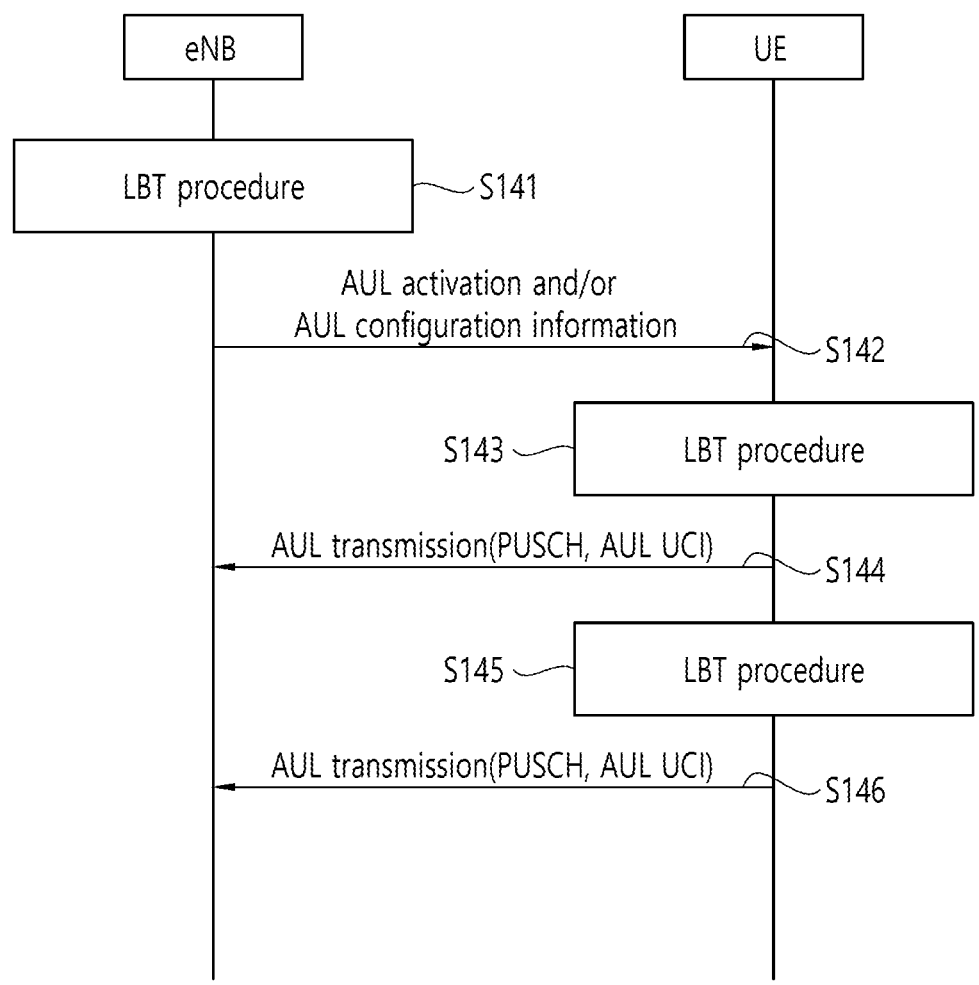
FIG. 14 illustrates an operation method between an eNB and a UE according to autonomous UL transmission (AUL transmission, which may be abbreviated as AUL).

FIG. 14 illustrates an operation method between an eNB and a UE according to autonomous UL transmission (AUL transmission, which may be abbreviated as AUL).

AUL may refer to uplink transmission capable of transmitting UL data without a UL grant.

The eNB performs an LBT procedure (S141) to provide AUL activation and/or AUL configuration information to the UE (S142). For example, the AUL configuration information can indicate an AUL subframe or an AUL slot in which AUL can be performed. For example, the AUL configuration information can include an X-bit bitmap (e.g., X=40 bits) and an AUL subframe or an AUL slot can be indicated through the bitmap.

The UE may transmit uplink data without a UL grant in the AUL subframe or the AUL slot indicated in the bitmap when instructed to activate AUL (S144 and S146). However, an LBT procedure may need to be performed before AUL (S143 and S145).

As the eNB transmits a PDCCH which is scheduling information necessary for decoding of a PDSCH along with the PDSCH, the UE can transmit AUL UCI which is information necessary for the eNB to decode a PUSCH along with the PUSCH in AUL.

For example, AUL-UCI may include information necessary for AUL PUSCH reception, such as a HARQ ID (identity), an NDI (new-data indicator), an RV (redundancy version), an AUL subframe starting position and an AUL subframe ending position, and information for sharing a UE-initiated COT (channel occupancy time) with an eNB.

Sharing a UE-initiated COT with an eNB may refer to an operation through which a UE hands over some of channels caught thereby to an eNB through random backoff based category 4 LBT (or type-1 channel access procedure) and the eNB can transmit a PDCCH (and a PDSCH) when a channel is idle through one-time LBT (one shot LBT) of 25 microseconds (using a timing gap prepared by emptying the ending symbol).

The present invention proposes an AUL-UCI configuration method when whether the ending symbol of the ending subframe of an AUL burst (one or more consecutive AUL PUSCH transmissions being referred to as an AUL burst for convenience) is emptied all the time or filled all the time (or whether the ending symbol of the ending subframe of the AUL burst is symbol #13 or symbol #12) is set for a UE. For example, whether to include ending position information of an AUL subframe or an AUL slot and information for sharing UE-initiated COT with an eNB in AUL-UCI is proposed/described.

In the present invention, a PBCH (physical broadcast channel) may refer to a physical channel over which basic system information (hereinafter, MIB (master information block)) such as a system band and an SFN (system frame number) is transmitted. RMSI (Remaining Minimum System Information) may refer to system information necessary for a random access procedure in addition to the MIB. OSI (other system information) may refer to system information other than the MIB and the RMSI.

Furthermore, an SS refers to a synchronization signal, a DM-RS (demodulation reference signal) refers to a reference signal for data demodulation, and a slot refers to a basic time unit composed of a plurality of OFDM symbols.

<AUL-UCI Configuration Method According to Higher Layer Signal and Method of Sharing COT with eNB>

When an eNB configures a UE to fill the ending subframe or the ending slot of an AUL burst all the time (or when the eNB indicates that the ending subframe or the ending slot of an AUL burst is symbol #13) through a higher layer signaling such as RRC signaling, AUL-UCI configuration and COT sharing with the eNB can be performed through at least one of the following methods.

[Proposed method #1] Method of causing AUL subframe ending position information (which may be abbreviated as ending position information) and information for sharing UE-initiated COT with an eNB (which may be abbreviated as COT sharing information) not to be included in AUL-UCI This method is a method through which AUL subframe ending position information and information for sharing UE-initiated COT with an eNB among various types of information included in AUL-UCI are not included in the AUL-UCI when the AUL-UCI is transmitted in each subframe or slot of an AUL burst because a UE knows that the ending symbol of the ending subframe (or slot) of the AUL burst is filled all the time or the ending symbol is the thirteenth symbol through RRC signaling.

[Proposed method #2] Method of causing information for sharing UE-initiated COT with an eNB not to be included in AUL-UCI and using AUL subframe ending position information to indicate whether a corresponding subframe is the ending subframe of an AUL burst This method is a method through which AUL subframe ending position information is used to indicate whether a corresponding subframe is the ending subframe of an AUL burst to an eNB because a UE knows that the ending symbol of the ending subframe or slot of the AUL burst is filled all the time or the ending symbol is the thirteenth symbol through RRC signaling and "information for sharing UE-initiated COT with an eNB" is not included in AUI-UCI because the UE-initiated COT cannot be shared with the eNB.

[Proposed method #3] Method of causing AUL subframe ending position information (ending position information) not to be included in AUL-UCI and using information for sharing UE-initiated COT with an eNB (COT sharing information) to indicate whether a corresponding subframe is the ending subframe of an AUL burst This method is a method through which the ending position information is not included in AUL-UCI because the ending position information is known through RRC signaling and the COT sharing information is used to indicate whether the corresponding subframe is the ending subframe of an AUL burst.

For example, when the COT sharing information is "1" (or "0"), it is possible to indicate whether a subframe after X (e.g., predefined as a value such as X=1 or set through RRC signaling) subframes from the corresponding subframe is the ending subframe of an AUL burst.

[Proposed method #4] Method of using AUL subframe ending position information (ending position information) to indicate whether a corresponding subframe is the ending subframe of an AUL burst or using COT sharing information to indicate whether the corresponding subframe is the ending subframe of the AUL burst This method is a method through which the ending position information is used to indicate whether the corresponding subframe is the ending subframe of an AUL burst or the COT sharing information is used to indicate whether the corresponding subframe is the ending subframe of the AUL burst because a UE knows that the ending symbol of the ending subframe or slot of the AUL burst is filled all the time or the ending symbol is the thirteenth symbol through RRC signaling.

For example, when the COT sharing information is "1" (or "0"), it is possible to indicate whether a subframe after X (e.g., predefined as a value such as X=1 or set through RRC signaling) subframes from the corresponding subframe is the ending subframe of an AUL burst.

The eNB can set the following for the UE with respect to AUL burst transmission through higher layer signaling (e.g., RRC signaling).

(1) The ending subframe or slot of an AUL burst is configured to be filled all the time or the ending symbol is configured to be the thirteenth symbol.

(2) Whether a subframe after X (e.g., predefined as a value such as X=2 or set through RRC signaling) subframes from the ending subframe is the ending subframe of an AUL burst is configured to be indicated when UE-initiated COT is shared with the eNB.

[Proposed method #5] Method of filling ending position information and COT sharing information in AUL UCI with a specific fixed bit value (e.g., 0 or 1) when (1) the ending symbol of the ending subframe or slot of an AUL burst is configured to be filled all the time and the signaling of (2) is not configured with respect to the above-described two signals According to this method, a UE does not signal COT sharing information to the eNB through AUL UCI when the ending symbol of the ending subframe or slot of an AUL burst is configured to be filled all the time through higher layer signaling such as RRC signaling. Accordingly, bits fixed to a specific bit value (e.g., 0 or 1) are filled in bit fields of AUL-UCI into which the ending position information and the COT sharing information are inserted to maintain a uniform AUL UCI size.

[Proposed method #6] Method of filling COT sharing information in AUL UCI with a specific fixed bit value (e.g., 0 or 1) when (1) the ending symbol of the ending subframe or slot of an AUL burst is configured to be the thirteenth symbol and signaling of (2) is not configured with respect to the aforementioned two signals.

According to this method, a UE does not signal COT sharing information to an eNB through AUL UCI when the UE knows that the ending symbol of the ending subframe or slot of an AUL burst is the thirteenth symbol all the time through higher layer signaling such as RRC signaling. Accordingly, the UE indicates the ending subframe of the AUL burst having the thirteenth symbol as the ending symbol through AUL subframe ending position information and fills a bit field into which the COT sharing information inserted with bits fixed to a specific bit value (e.g., 0 or 1) to maintain a uniform AUL UCI size.

Figure 15:
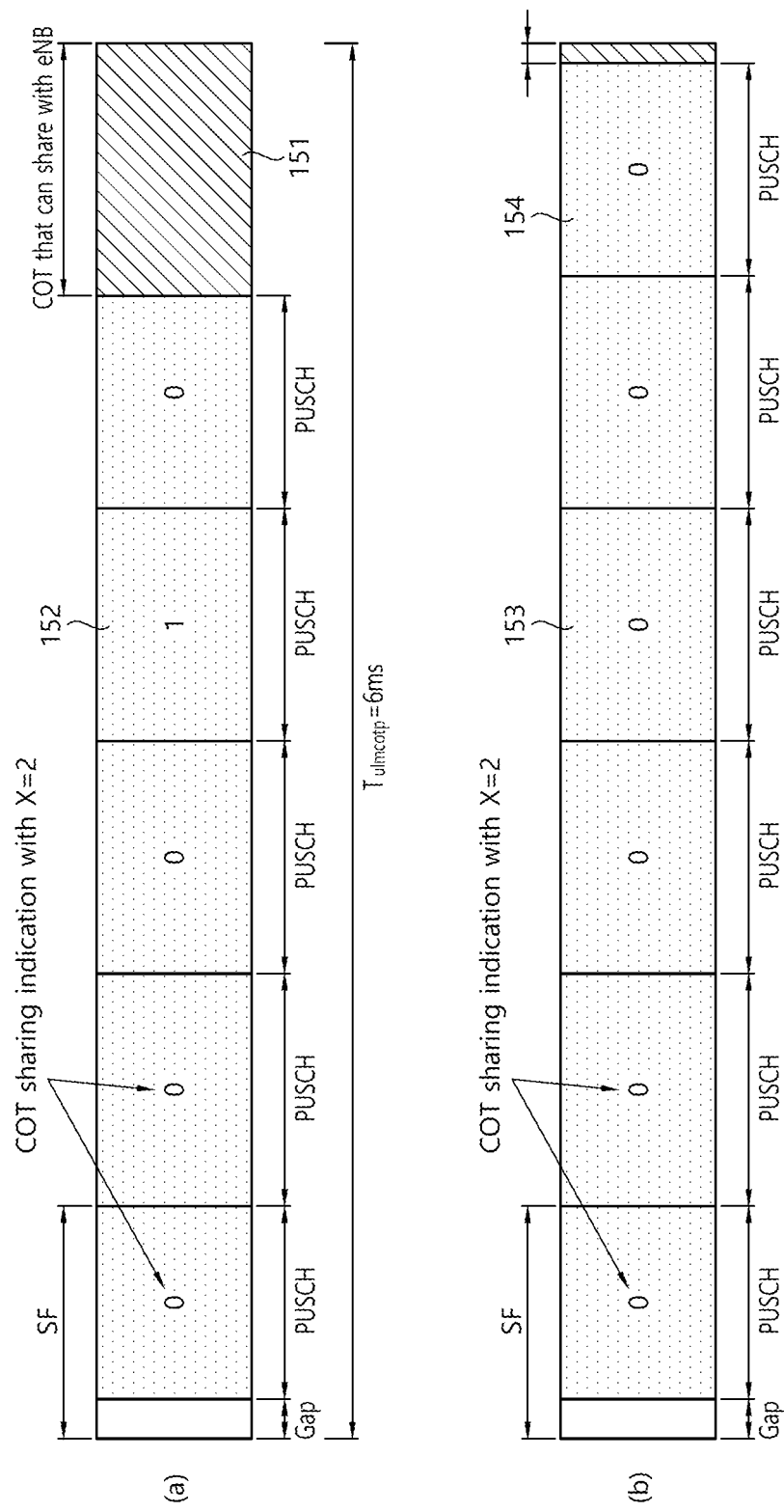
FIG. 15 shows an example of indicating whether COT can share with an eNB.

[Proposed method #7] Method of notifying an eNB that COT sharing is not possible in a subframe (i.e., a subframe X subframes before the ending subframe) which needs to be indicated as the ending subframe of an AUL burst when signaling (2) is configured for a UE and a PUSCH is transmitted through all subframes of MCOT secured through LBT corresponding to a priority class of traffic to be transmitted by the UE FIG. 15 shows an example of indicating whether COT can share with an eNB.

For example, when a channel access priority class of 3, $T_{ulmcotp}$ of 6 ms and X=2 are configured for a UE, COT can share with an eNB in the ending subframe 151 if a PUSCH is transmitted in 5 subframes in an AUL burst as shown in FIG. 15(a). COT sharing indication bits of the fourth subframe 152 previous to the ending subframe 151 of the AUL burst in AUL UCI can be filled with 1 and transmitted according to the configured X value. In this case, the eNB can perform maximum 2-symbol PDCCH transmission after 25 µs LBT in the remaining COT.

In FIG. 15(b), sufficient COT that can share with the eNB may not be present because 6 subframes are used for PUSCH transmission. In such a case, it is possible to notify the eNB that COT sharing is not possible by filling COT sharing indication bits of the fourth subframe 153 previous to the ending subframe 154 of the AUL burst in AUL UCI with 0 according to the configured X value.

Figure 16:
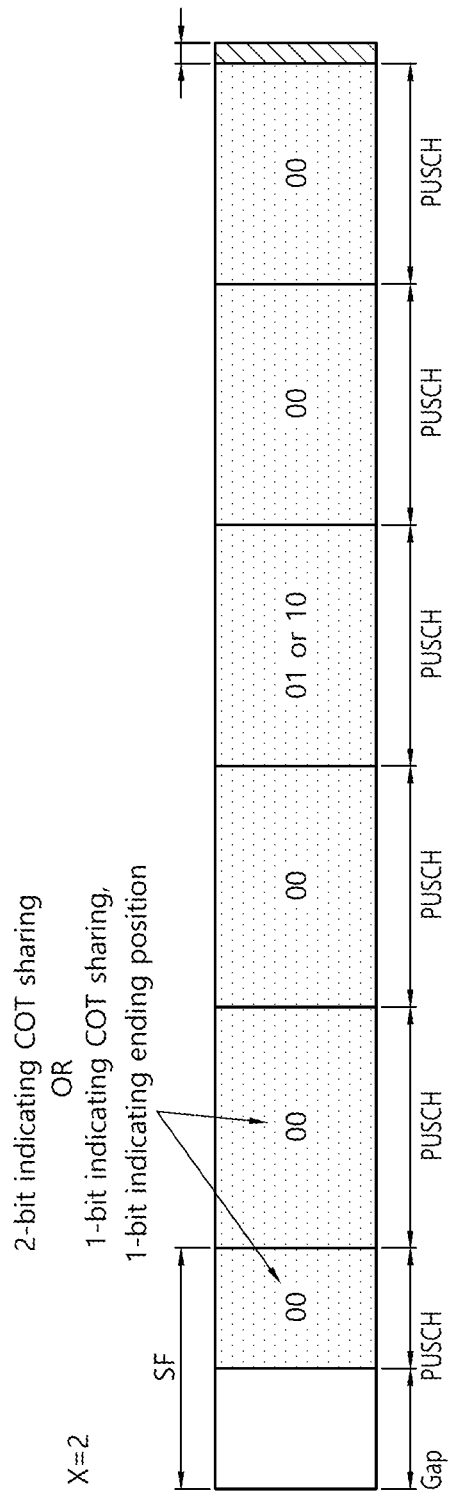
FIG. 16 shows an example of a method of indicating COT sharing with an eNB according to a PUSCH starting position.

FIG. 16 shows an example of a method of indicating COT sharing with an eNB according to a PUSCH starting position.

With respect to a PUSCH transmission starting position in an AUL burst starting subframe, a method of determining a transmission starting point in a set of a plurality of transmission starting points at equal intervals, from which a PUSCH will be transmitted, according to higher layer signaling such as RRC signaling or UE selection may be used.

Specifically, a UE can randomly select one of the plurality of transmission starting points as a PUSCH starting position if AUL is full BW transmission and can transmit a PUSCH at one starting position in the set which is set through higher layer signaling such as RRC signaling if AUL is partial BW transmission.

When PUSCHs are transmitted through all subframes of MCOT as shown in FIG. 16, if a gap generated between the first subframe boundary and a PUSCH transmission starting position is greater than "1 OS–25 µs" (here, "1 OS" is a time required for one OFDM symbol) necessary for the eNB for COT sharing at the ending symbol of the ending subframe of the AUL burst, the eNB can perform maximum 1-symbol PDCCH transmission using the remaining COT.

That is, even when the UE transmits a PUSCH through all subframes in MCOT, (1) in the case of PUSCH transmission through full bandwidth in AUL, MCOT sharing is possible if the UE randomly selects one of a plurality of PUSCH starting positions in a set and thus a gap between the first subframe starting boundary and the PUSCH transmission starting position is generated and the gap is greater than a time (e.g., "1 OS–25 s") which considers a time such as LBT necessary for the eNB to transmit a PDCCH in a COT interval. In this case, the eNB can perform maximum 1-symbol PDCCH transmission.

(2) When AUL transmits a PUSCH through partial BW, the eNB can configure one PUSCH transmission starting position in a set of a plurality of PUSCH starting positions for the UE through higher layer signaling such as RRC signaling. Similarly, if a gap generated between the first subframe starting boundary and the PUSCH transmission starting position configured by the eNB is greater than a time (e.g., "1 OS-25 μs") which considers a time such as LBT necessary for the eNB to transmit a PDCCH in a COT interval, MCOT sharing is possible. In this case, the eNB can perform maximum 1-symbol PDCCH transmission.

In the aforementioned case, it is possible to notify the eNB that 1-symbol PDCCH transmission can be performed in the remaining COT through the following two methods.

According to the first method, one of three states can be indicated by increasing a COT sharing indication bit field in AUL UCI to 2 bits. For example, the COT sharing indication field can indicate states of (1) 00: maximum 2-symbol PDCCH transmission can be performed, (2) 01 or 10: 1-symbol PDCCH transmission can be performed and (3) 11: COT sharing is not possible.

The second method is a method of using the last symbol indication field in AUL UCI. The ending position indication field indicates that the ending subframe of an AUL burst is the end of the AUL burst in the ending subframe and the rang of X values configured by a subframe in which COT sharing indication is transmitted is 1<X<5 which is larger than 1 all the time, and thus it is possible to indicate whether MCOT sharing for PDCCH transmission of an eNB is possible through two fields of AUL UCI in the subframe in which COT sharing is indicated according to X value.

For example, a UE can notify an eNB whether COT sharing is possible through the COT sharing indication field in AUL UCI in a subframe X subframes before the ending subframe of an AUL burst according to a set X value. It is possible to indicate (1) 00: COT sharing is not possible, (2) 10: maximum 1-symbol PDCCH transmission is possible and (3) 11: maximum 2-symbol PDCCH transmission is possible through bits of two fields (COT sharing indication field and ending position indication field) in the AUL UCI. When the COT sharing indication bit is 0, it indicates that sharing is not possible. When the COT sharing indication bit is 1 and thus COT sharing is possible, it is possible to notify the eNB of a maximum number of symbols for PDCCH transmission in the remaining COT intervals through the ending position indication field.

[Proposed method #8] Method of transmitting an AUL PUSCH only through "$N_{SF,max}-1$" or less subframes all the time instead of permitting AUL PUSCH transmission using all of $N_{SF,max}$ subframes for COT sharing and signaling COT sharing in a subframe configured by an eNB when a total number of transmittable subframes in MCOT is $N_{SF,max}$ in a state in which the above-described signaling (2) is configured for a UE The above proposed method may be applied to only a priority class that satisfies a condition of MCOT≥≥X.

In a state in which a total of 6 AUL bursts can be transmitted and X=2 has been configured as shown in FIG. 15, a UE is not permitted to transmit an AUL PUSCH through all subframes in COT as shown in FIG. 15(b) and is caused to perform PUSCH transmission only through 5 or less subframes as shown in FIG. 15(a), and it is possible to notify an eNB that COT sharing is possible in a configured subframe.

As an embodiment of [proposed method #7] and [proposed method #8], it is possible to notify an eNB that COT sharing is not possible when X is configured for a UE and the UE performs PUSCH transmission using all of $N_{SF,max}$ subframes in a maximum channel occupancy time (MCOT) for a priority class that satisfies a condition of MCOT≥≥X, and it is possible to notify the eNB that COT sharing is possible when the UE performs PUSCH transmission using $N_{SF,max}-1$ or less subframes.

As another embodiment of [proposed method #7] and [proposed method #8], X is configured for a UE and the UE transmits a PUSCH through $N_{SF,max}-1$ or less subframes all the time instead of being permitted to transmit a PUSCH using $N_{SF,max}$ subframes, which is a maximum number of subframes that can be transmitted in an MCOT, for a priority class that satisfies a condition of MCOT≥≥X and can signal COT sharing in a subframe configured by an eNB. However, up to $N_{SF,max}$ AUL PUSCHs can be transmitted all the time without being limited by the above proposed method when X is not configured or for priority classes that do not satisfy MCOT≥≥X.

[proposed method #9] Method for an eNB to transmit maximum 1-symbol PDCCH in MCOT of a UE through COT sharing when the UE transmits an AUL PUSCH using all of $N_{SF,max}$ subframes that can be transmitted in MCOT at a transmission starting point set by the eNB through partial BW outside the MCOT.

The above proposed method may be limited to only a priority class that satisfies a configuration of MCOT≥≥X.

When a UE transmits AUL through partial BW, an eNB starts AUL burst transmission at a specific starting position set by the eNB for the UE through higher layer signaling. In this case, the eNB can be aware of ID of a UE through transmitted AUL-UCI and can detect a correct AUL burst transmission starting point set therefor. Accordingly, the eNB can determine that MCOT sharing is possible and transmit maximum 1-symbol PDCCH if a gap is generated between a starting boundary of a first subframe and a PUSCH transmission starting point on the basis of a starting position set therefor is greater than a time (1 OS-25 μs) that considers a time such as LBT necessary for PDCCH transmission in a COT interval

[Proposed method #10] Method for an eNB to transmit maximum 1-symbol PDCCH in MCOT of a UE through COT sharing when the UE performs full BW AUL transmission using all of $N_{SF,max}$ subframes that can be transmitted in the MCOT at one of a set of a plurality of transmission starting points set by the eNB outside of MCOT of the eNB The above proposed method may be limited to only a priority class that satisfies a condition of MCOT≥≥X.

When the UE performs full BW AUL transmission, the UE can select any one from a set of a plurality of starting positions set by the eNB for the UE through higher layer signaling and start transmission. In this case, the eNB cannot be aware of the correct starting position of the UE but can determine whether maximum 1-symbol PDCCH can be transmitted in the COT of the UE according to the earliest starting position value in the set starting position set.

The eNB can transmit maximum 1-symbol PDCCH upon determining that MCOT sharing is possible if a gap generated when a PUSCH is transmitted at the earliest starting position at the first subframe starting boundary on the basis of the earliest starting position value in the set of starting positions set for the UE is greater than "time (1 OS-25 μs) that considers a time such as LBT necessary for the eNB to transmit a PDCCH in a COT interval".

In [proposed method #7], [proposed method #9] and [proposed method #10], when the UE intends to share the remaining COT with the eNB after the UE transmits a PUSCH using the MCOT thereof, as shown in FIG. 15(b), the UE can share the remaining COT with the eNB and the eNB can transmit maximum 1-symbol PDCCH only when AUL burst starting time is {OS #1}, that is, when the whole first symbol is emptied if a time gap of 25 μs necessary for UL/DL switching is included in the MCOT. If the time gap of 25 μs necessary for UL/DL switching is not included in the MCOT of the UE, the UE can share the remaining COT with the eNB and the eNB can transmit maximum 1-symbol PDCCH only when the AUL burst starting time is one of {52, 61, OS #1}. When AUL burst transmission of the UE starts at a time other than the aforementioned starting time, 1-symbol PDCCH transmission of the eNB in the remaining COT exceeds the MCOT of the UE and thus COT sharing is not permitted.

<CWS Adjustment Method Based on HARQ-ACK Feedback Information in AUL-DFI (Downlink Feedback Information)>

Hereinafter, a method of adjusting a contention window size (CWS) of a UE according to HARQ-ACK information in AUL-DFI when an eNB feeds back a PUSCH transmission result to the UE through the AUIL-DFI is proposed.

When a UL grant or AUL-DFI has been received in an N-th subframe, a reference subframe may be an (N−1)-th subframe or the first subframe of the last UL burst prior to the (N−4)-th subframe.

When a UE performs PUSCH transmission through random backoff based category 4 LBT (or type-1 channel access procedure), (1) CWS adjustment of the UE when a UL grant has been received can be determined according to an NDI value of HARQ ID corresponding to a reference subframe associated with at least one HARQ process in the UL grant (hereinafter referred to as HARQ_ID_ref). When the NDI value has been toggled, it is regarded as new data and a CW per priority class (referred to as $CW_p$ and $p \in \{1, 2, 3, 4\}$) is set to a minimum CW (hereinafter referred to as $CW_{min,p}$) corresponding to a relevant priority class. If not, NACK is considered to be fed back and $CW_p$ can be adjusted to a CW value higher by one step which corresponds to the relevant priority class.

(2) When AUL-DFI has been received, PUSCH transmission is performed without a UL grant, and thus HARQ-ACK feedback is received from the eNB through AUL-DFI and the UE can adjust a CWS according to the HARQ-ACK feedback result of HARQ_ID_ref in the AUL-DFI.

That is, CW is reset to $CW_{min,p}$ when a feedback result of a HARQ process ID corresponding to the relevant reference subframe is ACK and $CW_p$ is adjusted to a CW value higher by one step which corresponds to the relevant priority class when the feedback result is NACK.

A HARQ-ACK bitmap field is present in AUL-DFI. 1 bit of the bitmap can refer to a HARQ-ACK result of each UL-HARQ process, and the bitmap may be 16 bits in the case of AUL TM1 (transmission mode 1) and 32 bits in the case of AUL TM2 (transmission mode 2, 2 TB transmission).

Further, the AUL-DFI may additionally include HARQ-ACK feedback information about a HARQ process which is not set to AUL. If SUL is set to TM2 and AUL is set to TM1, HARQ-ACK corresponding to a HARQ process which is not set to AUL of AUL-DFI can be spatially bundled.

Figure 17:
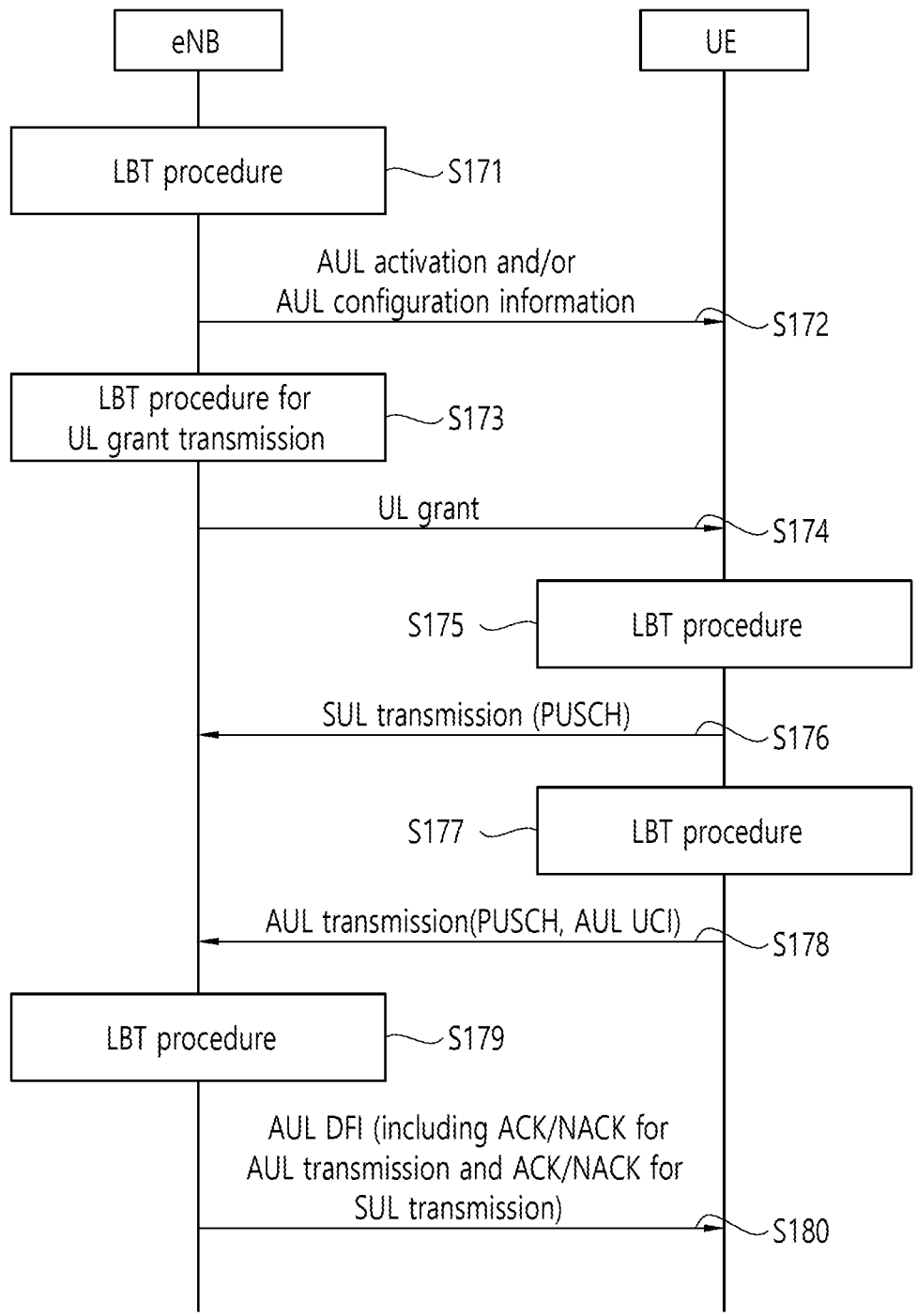
FIG. 17 illustrates an operation of a UE to perform AUL transmission and SUL transmission in an unlicensed band.
Figure 18:
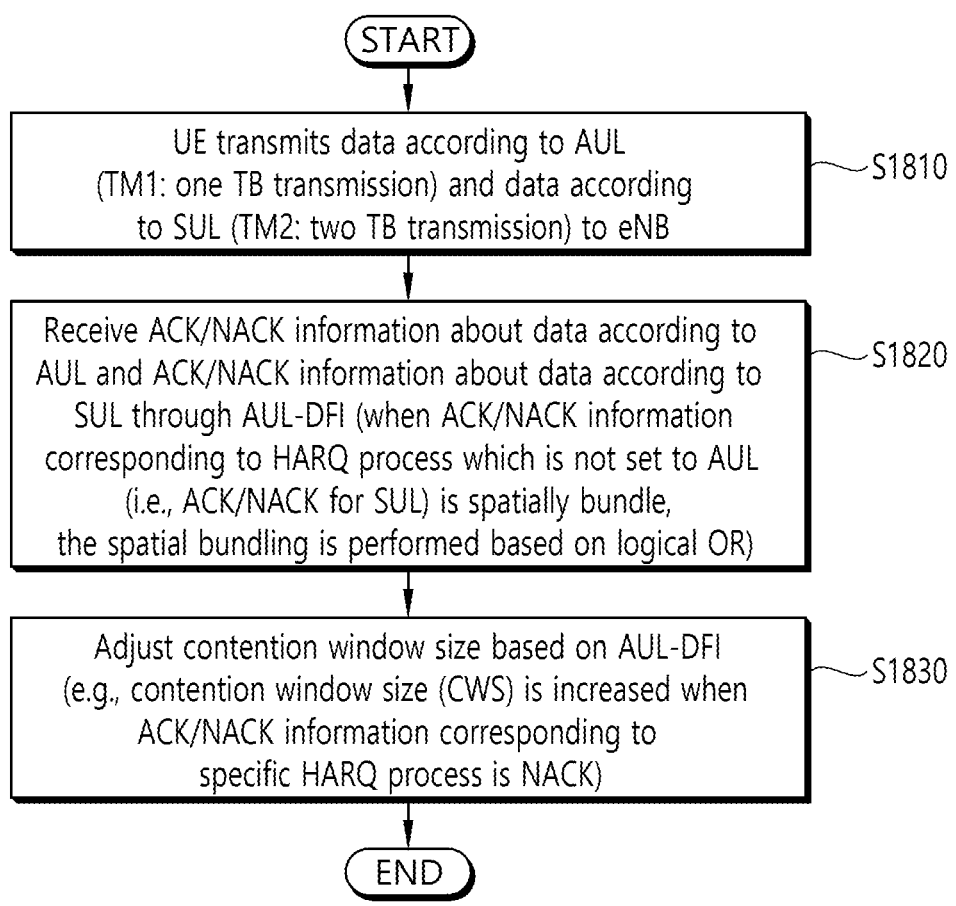
FIG. 18 shows a UE operation according to proposed method #11.
Figure 19:
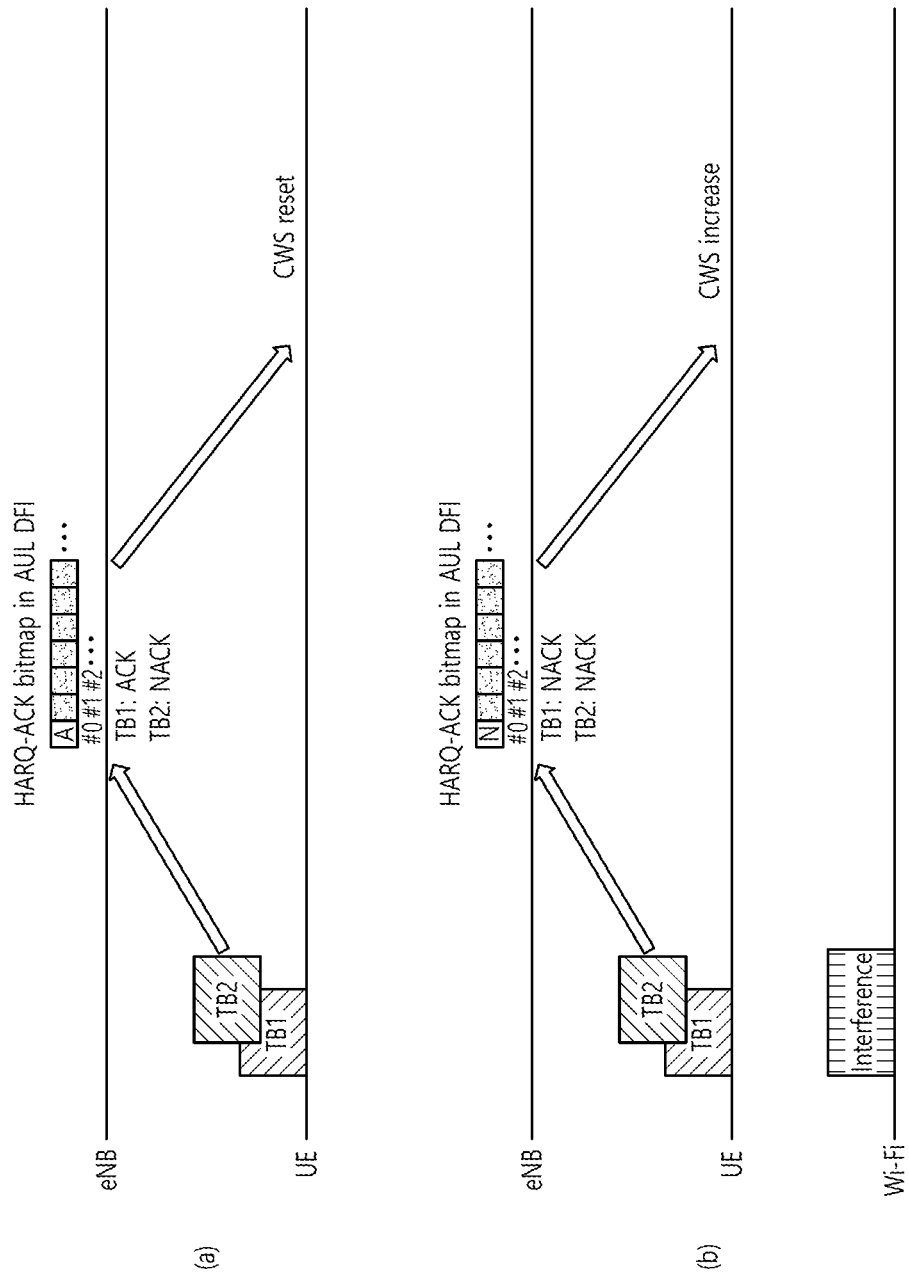
FIG. 19 shows an example of adjusting a CWS according to proposed method #11.

In FIGS. 17 to 19 and description thereof, SUL is set to TM2 (mode in which two transport blocks can be transmitted within one TTI) and AUL is set to TM1 (mode in which one transport block can be transmitted within one TTI).

FIG. 17 illustrates an operation of a UE to perform AUL transmission and SUL transmission in an unlicensed band.

Referring to FIG. 17, an eNB can provide AUL activation and/or AUL configuration information to a UE when an LBT procedure (channel access procedure) has been successfully performed (S172).

The eNB performs an LBT procedure for UL grant transmission (S173) and can transmit a UL grant to the UE when the LBT procedure has been successfully performed (S174).

The UE performs an LBT procedure (S175) and can perform SUL transmission, that is, PUSCH transmission based on the UL grant when the LBT procedure has been successfully performed (S176).

The UE performs an LBT procedure (S177) and can perform AUL transmission, that is, PUSCH transmission that is not based on the UL grant when the LBT procedure has been successfully performed (S178).

The eNB performs an LBT procedure (S179) and transmits AUL-DFI when the LBT procedure has been successfully performed (S180). The AUL-DFI may include ACK/NACK for the AUL transmission and ACK/NACK for the SUL transmission. The AUL-DFI can be transmitted through a DCI format.

As described above, the AUL-DFI may include the HARQ-ACK bitmap field which can be composed of 16 bits or 32 bits, for example. The HARQ-ACK bitmap field can be composed of 16 bits when the transmission mode of AUL transmission is TM1 (transmission mode 1) in which only one transport block (equivalently codeword) is transmitted within one TTI (e.g., subframe) and can be composed of 32 bits when the transmission mode of AUL transmission is TM2 (transmission mode 2) in which two transport blocks (two codewords) are transmitted within one TTI.

The bits of the HARQ-ACK bitmap may be associated with different HARQ processes. For example, it is assumed that SUL transmission is associated with a first HARQ process (HARQ process ID #1) and AUL transmission is associated with a second HARQ process (HARQ process ID #2). In this case, the first bit of the HARQ-ACK bitmap can represent ACK/NACK for the first HARQ process and the second bit can represent ACK/NACK for the second HARQ process.

Since AUL-DFI transmission opportunity of an eNB may be restrictive in an unlicensed band, ACK/NACK for AUL transmission and ACK/NACK for SUL transmission can be transmitted together as described above.

Both of ACK/NACK information about HARQ (ID) set to AUL and ACK/NACK information about HARQ (i.e., SUL) (ID) that is not set to AUL are included in AUL-DFI in order to aid in CWS adjustment of a UE. CWS is adjusted on the basis of a UL grant in the case of SUL. When a UL grant for retransmission is delayed due to LBT failure, CWS update of a UE is delayed. In consideration of this, CWS adjustment of the UE is performed by additionally referring to SUL HARQ-ACK (ACK/NACK information) included in AUL-DFI. HARQ-ACK (ACK/NACK information) about SUL included in AUL-DFI is irrelevant to actual retransmission and can be used only for CWS adjustment.

Meanwhile, in the example of FIG. 17, SUL transmission may be set to transmission mode 2 and AUL transmission may be set to transmission mode 1. In this case, the HARQ-ACK bitmap is composed of 16 bits and ACK/NACK signals for two transport blocks (two codewords) within one TTI are spatially bundled and then transmitted through a specific bit (bit corresponding to a HARQ process (ID) of SUL transmission) of the HARQ-ACK bitmap in SUL transmission. Here, a contention window size of the following LBT procedure (channel access procedure) is set differently according to which one of ACK and NACK is used to transmit the specific bit. In such a case, application of a spatial bundling method such as proposed method #11 is proposed.

[Proposed method #11] When HARQ-ACKs corresponding to a HARQ process which is not set to AUL are configured according to spatial bundling in AUL-DFI, spatial bundling is performed as ACK when ACK/NACK for at least one transport block (TB) is ACK and performed as NACK only when ACK/NACKs for all TBs are all NACKs in the AUL-DFI. That is, spatial bundling according to a logical OR operation is proposed.

With respect to CWS adjustment of a UE in transmission mode 2 (TM2), $CW_p$ is adjusted to a CW value (refer to table 5) higher by one step which corresponds to the relevant priority class only when two TBs are NACK. Accordingly, spatial bundling needs to be appropriately performed such that the corresponding principle is observed even when HARQ-ACK information about a HARQ process that is not set to AUL is included in AUL-DFI.

That is, when a HARQ process that is not set to AUL is configured in transmission mode 2 (TM2) and corresponding HARQ-ACK results are spatially bundled, an AUL-DFI HARQ-ACK bitmap is configured such that a case in which at least one TB is ACK corresponds to ACK and a case in which HARQ feedback results for two TBs are NACKs corresponds to NACK.

Then, the contention window (CW) can be reset to $CW_{min,p}$ when a feedback result of a HARQ process ID corresponding to the relevant reference frame when AUL-DFI is received is ACK and $CW_p$ can be adjusted to a CW value higher by one step which corresponds to the relevant priority class when the feedback result is NACK, as described above in (2).

FIG. 18 shows a UE operation according to proposed method #11.

Referring to FIG. 18, a UE transmits data according to AUL (first data) and data according to SUL (second data) to an eNB (S1810). The UE can transmit the first data and the second data to the eNB in an unlicensed band.

As described above, autonomous uplink (AUL) transmission may be uplink transmission performed without receiving a grant from the eNB and SUL may be uplink transmission performed based on a grant received from the eNB, as described above.

For example, the UE can transmit the data according to AUL (first data) in a first subframe to the eNB and transmit the data according to SUL (second data) in a second subframe to the eNB. The first data may be data related to a first HARQ process (ID) and the second data may be data related to a second HARQ process (ID). Here, it is assumed that an LBT procedure has been successfully performed prior to each data transmission. As described above, the LTB procedure may be a procedure of sensing a channel in a specific duration $T_d$, and when the channel is idle in the specific duration and the value of a random backoff counter is 0, transmitting data to an eNB through the channel. This has been described above in detail. AUL can be set to transmission mode 1 (i.e., one TB (codeword) can be transmitted within one TTI) and SUL can be set to transmission mode 2 (i.e., two TBs (two codewords) can be transmitted within one TTI). This state is assumed for AUL/SUL hereinafter.

The UE receives ACK/NACK information (first ACK/NACK information) for the data according to AUL and ACK/NACK information (second ACK/NACK information) for the data according to SUL through AUL-DFI (HARQ-ACK bitmap) (S1820). The first bit of the HARQ-ACK bitmap can indicate the first ACK/NACK information about the first data and the second bit thereof can indicate the second ACK/NACK information about the second data. The AUL-DFI can be received through a DCI format.

Here, ACK/NACK information corresponding a HARQ process that is not set to AUL (i.e., ACK/NACK for data according to SUL) is spatially bundled and included in a specific bit of the HARQ-ACK bitmap. In this case, the spatial bundling is performed based on logical OR. For example, when the data according to AUL includes one TB and the data according to SUL includes a plurality of TBs, the second ACK/NACK information can be set to ACK if at least one of the plurality of TBs corresponds to ACK and set to NACK if all of the plurality of TBs correspond to NACKs and can be received through a HARQ-ACK bitmap field in the AUL-DFI. For example, the eNB can generate ACK or NACK per TB (equivalently codeword) in the corresponding TTI and then finally generate one ACK or NACK as ACK/NACK information for the TTI through spatial bundling. For example, when a TTI is a subframe (or slot) and a plurality of (e.g., 2) TBs has been received in one TTI, ACK/NACK is generated as (ACK, ACK), (ACK, NACK), (NACK, ACK) or (NACK, NACK) according to whether each TB included in the subframe (or slot) has been successfully decoded and then spatial bundling is performed according to a logical OR operation. In this case, when a logical OR operation is performed on the aforementioned four ACK/NACK cases, ACK, ACK, ACK and NACK are generated respectively and each can be transmitted through a specific bit (bit corresponding to a HARQ process performed in the TTI) of the HARQ-ACK bitmap field. The second ACK/NACK information included in the AUL-DFI may be information that is not used for HARQ (Hybrid automatic repeat request) operation but is used for contention window size adjustment.

The UE adjusts a contention window size on the basis of the AUL-DFI (S1830). As described above, the contention window size (CWS) may be related with determination of an initial value of a counter used for a channel access procedure (CAP) of the UE.

The UE can adjust the CWS using at least one of ACK/NACK information about the first data and ACK/NACK information about the second data. For example, when the data (second data) according to SUL is for a specific HARQ process (second HARQ process) and ACK/NACK information about the data according to SUL is spatially bundled as NACK in the HARQ-ACK bitmap and received, a CWS associated with the specific HARQ process is increased. Referring to Table 5, when the channel access priority class p is 3 and the current CWS is 15, for example, the CWS is increased to 31 (increased to 63 when the current CWS is 31). If the ACK/NACK information about the second data is spatially bundled ACK, the CWS associated with the second HARQ process can be reset to a minimum value.

FIG. 19 shows an example of adjusting a CWS according to proposed method #11.

Referring to FIG. 19, transmission mode 2 can be set for a UE with respect to a HARQ process having HARQ process ID #0. Further, it is assumed that AUL transmission is also set for the UE. The UE can transmit two TBs (two codewords) scheduled by a UL grant to an eNB through a specific subframe. The two TBs are assumed as TB1 and TB2.

In this case, the eNB can generate ACK for TB1 because decoding of TB1 is successful and generate NACK for TB2 because decoding of TB2 has failed, as shown in FIG. 19(a). In this case, the eNB can generate ACK by performing spatial bundling according to a logical OR operation on the ACK and NACK. Thereafter, the eNB can transmit ACK through a bit (e.g., bit #0) corresponding to HARQ process ID #0 in the HARQ-ACK bitmap.

The UE can reset the CWS to a minimum value without increasing the same because the UE has received ACK for transmission of two TBs. The minimum value can be independently set according to the channel access priority class p as shown in Table 5.

Alternatively, the eNB can generate NACK for TB1 because decoding of TB1 has failed and also generate NACK for TB2 because decoding of TB2 has failed, as shown in FIG. 19(b). In this case, the eNB can generate NACK by performing spatial bundling according to a logical OR operation on the NACK and NACK. Thereafter, the eNB can transmit NACK through a bit (e.g., bit #0) corresponding to HARQ process ID #0 in the HARQ-ACK bitmap.

The eNB has failed in decoding of two RBs transmitted from the UE because other nodes (e.g., APs or STAs according to Wi-Fi) are likely to simultaneously perform transmission during TB transmission of the UE to interfere therewith. In such an environment, probability of collision is reduced by increasing CWS.

On the other hand, when the eNB has successfully decoded at least one of the two RBs transmitted from the UE, other nodes are less likely to simultaneously perform transmission during TB transmission of the UE to interfere therewith and normal decoding error is likely to be generated. Accordingly, it is not necessary to increase CWS in such a case and thus CWS is reset.

Additionally, the aforementioned proposed method can also be applied when a UL subframe set to AUL is transmitted through SUL according to a UL grant. For example, when a UL subframe originally set to TM1 AUL is transmitted through TM2 SUL according to a UL grant, if a HARQ process corresponding to the subframe is included in an AUL-DFI HARQ-ACK bitmap, CWS adjustment can be performed by spatially bundling ACK/NACK as ACK when at least one of TBs transmitted in the subframe is ACK and spatially bundling ACK/NACK as NACK only when all TBs are NACK.

The present invention is not limited to uplink or downlink communication between a UE and an eNB and may be used for direct communication between UEs. Here, an eNB or a relay node can use the above-described proposed methods.

Examples of the above-described proposed methods may also be included as one of the implementation methods of the present invention. And, therefore, it is an evident fact that the above-described examples can be understood as a type of proposed methods. Additionally, although the above-described proposed methods can be implemented independently, the method may also be implemented as a combined (or integrated) form of part of the proposed methods. For the information on the application or non-application of the proposed methods (or information on the rules of the proposed methods), a rule may be defined so that the information can be notified through a signal (e.g., a physical layer signal or a higher layer signal), which is predefined by the base station to the UE or by a transmitting UE to a receiving UE.

Figure 20:
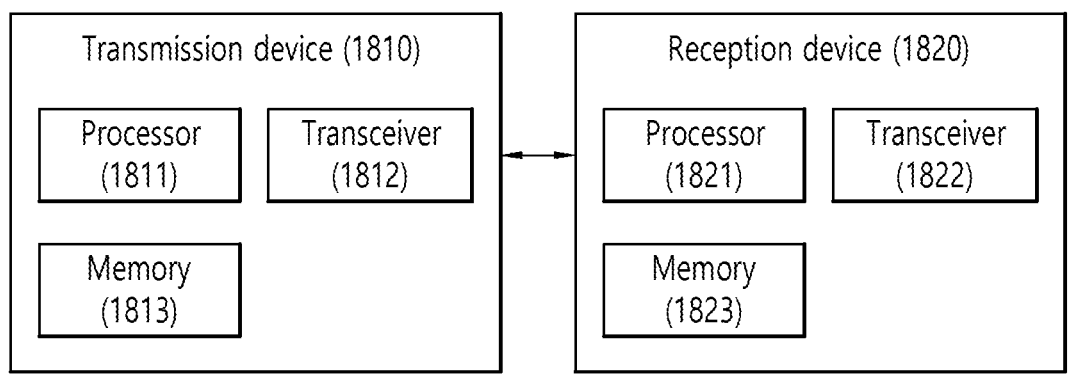
FIG. 20 is a block diagram showing components of a transmitting device and a receiving device for implementing the present invention.

FIG. 20 is a block diagram showing components of a transmitting device 1810 and a receiving device 1820 for implementing the present invention. Here, the transmitting device and the receiving device may be a base station and a terminal.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present invention.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present invention. The processors 1811 and 1821 may be referred to as controllers, microcontrollers, microprocessors, microcomputers, etc. The processors 1811 and 1821 can be realized by hardware, firmware, software or a combination thereof. When the present invention is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present invention. When the present invention is realized using firmware or software, the firmware or software may be configured to include modules, procedures or functions for performing functions or operations of the present invention, and the firmware or software configured to implement the present invention may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present invention. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 21:
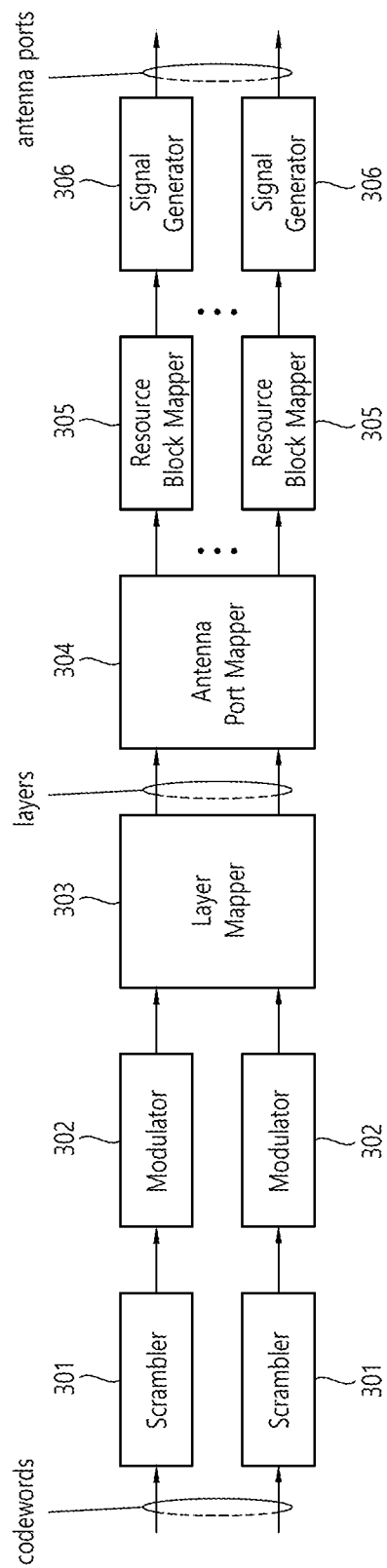
FIG. 21 illustrates an example of a signal processing module structure in the transmitting device.

FIG. 21 illustrates an example of a signal processing module structure in the transmitting device 1810. Here, signal processing can be performed by a processor of a base station/terminal, such as the processors 1811 and 1821 of FIG. 20.

Referring to FIG. 21, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 22:
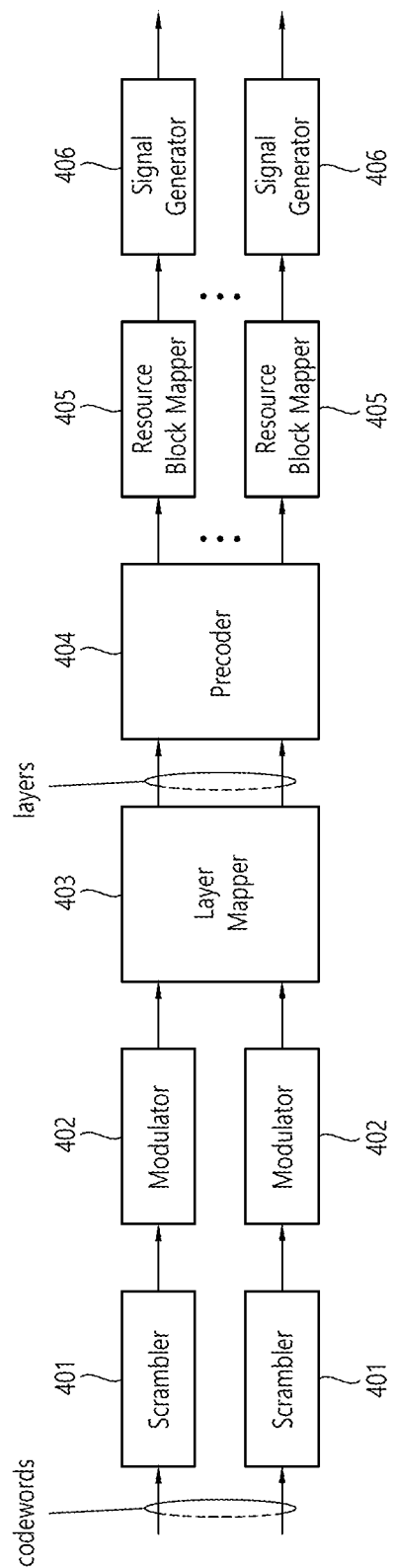
FIG. 22 illustrates another example of the signal processing module structure in the transmitting device.

FIG. 22 illustrates another example of the signal processing module structure in the transmitting device 1810. Here, signal processing can be performed by a processor of a terminal/base station, such as the processors 1811 and 1821 of FIG. 20.

Referring to FIG. 22, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FFT module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 23:
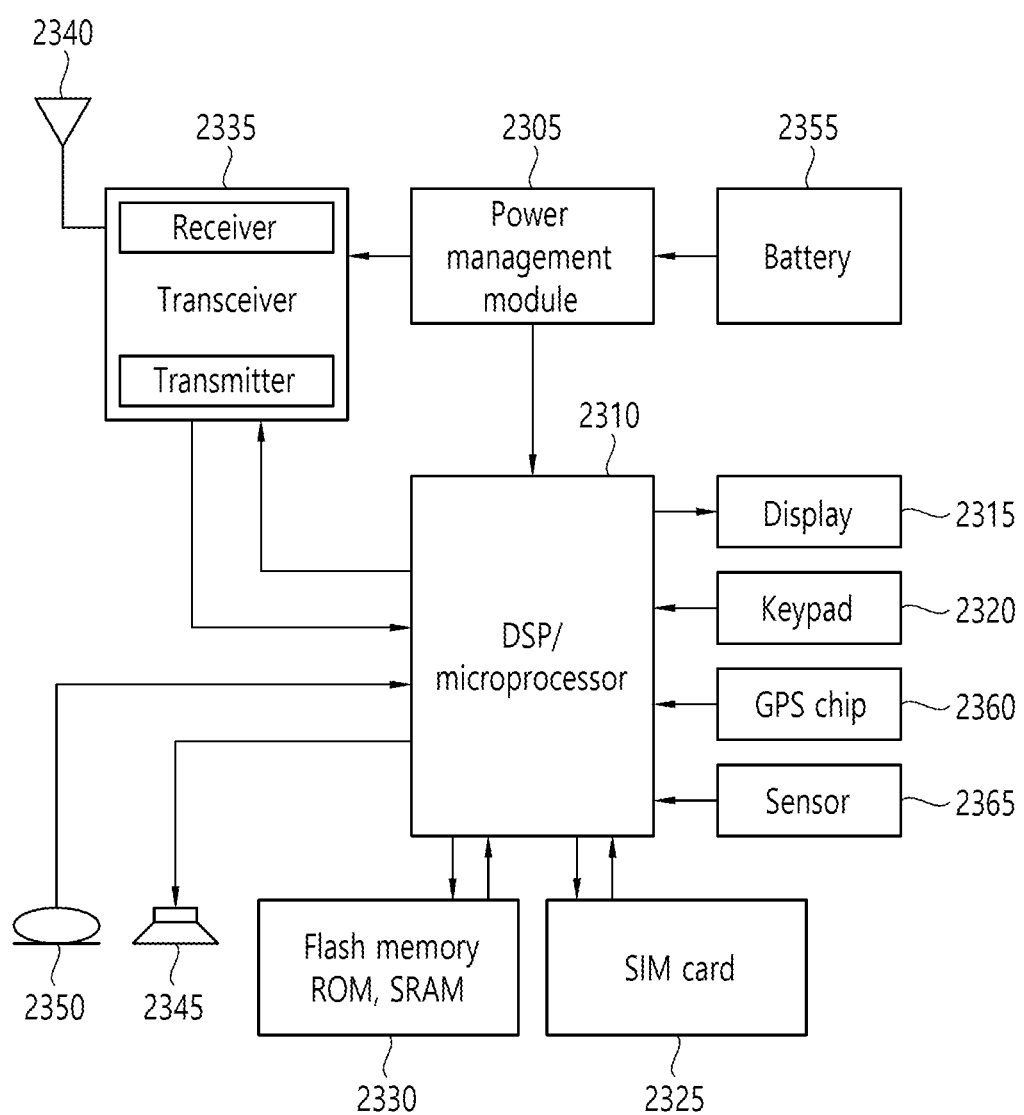
FIG. 23 illustrates an example of a wireless communication device according to an implementation example of the present invention.

FIG. 23 illustrates an example of a wireless communication device according to an implementation example of the present invention.

Referring to FIG. 23, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 23 may be the processors 1811 and 1821 in FIG. 20.

The memory 2330 is connected to the processor 2310 and stores information related to operations of the processor. The memory may be located inside or outside the processor and connected to the processor through various techniques such as wired connection and wireless connection. The memory 2330 in FIG. 23 may be the memories 1813 and 1823 in FIG. 20.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 23 may be the transceivers 1812 and 1822 in FIG. 20.

Although not shown in FIG. 23, various components such as a camera and a universal serial bus (USB) port may be additionally included in the terminal. For example, the camera may be connected to the processor 2310.

FIG. 23 is an example of implementation with respect to the terminal and implementation examples of the present invention are not limited thereto. The terminal need not essentially include all the components shown in FIG. 23. That is, some of the components, for example, the keypad 2320, the GPS chip 2360, the sensor 2365 and the SIM card 2325 may not be essential components. In this case, they may not be included in the terminal.

What is claimed is:

1. A method for adjusting a contention window size (CWS) of a user equipment (UE) in a wireless communication system, the method comprising:
   transmitting first data based on an autonomous uplink (AUL) transmission to a base station;
   transmitting second data based on a grant-based uplink transmission to the base station;
   receiving first acknowledgement/negative acknowledgement (ACK/NACK) information for the first data and second ACK/NACK information for the second data through a hybrid automatic repeat request (HARQ)-ACK bitmap included in an AUL-downlink feedback indication (AUL-DFI); and
   adjusting the contention window size based on at least one of the first ACK/NACK information and the second ACK/NACK information included in the HARQ-ACK bitmap,
   wherein a size of the HARQ-ACK bitmap is dependent on a transmission mode of the AUL transmission, and
   wherein, based on (i) the AUL transmission configured with a transmission mode 1 in which only one transport block is included in a subframe, and (ii) the grant-based uplink transmission configured with a transmission mode 2 in which up to 2 transport blocks are included in a subframe: the second ACK/NACK information included in the HARQ-ACK bitmap is ACK based on ACK/NACK for at least one of the 2 transport blocks being ACK and the second ACK/NACK information included in the HARQ-ACK bitmap is NACK based on ACK/NACKs for the 2 transport blocks all being NACKs.

2. The method of claim 1, wherein the contention window size is related with determination of an initial value of a counter used for a channel access procedure (CAP) of the UE.

3. The method of claim 2, wherein the UE senses a channel in a first specific duration, and based on the channel being idle in the first specific duration and the value of the counter is 0, transmits the first data to the base station through the channel.

4. The method of claim 2, wherein the UE senses a channel in a second specific duration, and based on the channel being idle in the second specific duration and the value of the counter being 0, transmits the second data to the base station through the channel.

5. The method of claim 1, wherein the first data is data related with a first HARQ process and the second data is data related with a second HARQ process.

6. The method of claim 1, wherein the contention window size of the UE is increased based on NACKs being generated for all of the plurality of transport blocks included in the second data and thus the second ACK/NACK information being NACK.

7. The method of claim 1, wherein the contention window size of the UE is reset to a minimum value based on the second ACK/NACK information for the second data being ACK.

8. The method of claim 1, wherein the AUL transmission is uplink transmission performed without receiving a grant from the base station, and the grant-based uplink transmission is uplink transmission performed based on a grant received from the base station.

9. The method of claim 1, wherein the second ACK/NACK information included in the AUL-DFI is not used for a hybrid automatic repeat request (HARD) operation and is used for adjustment of the contention window size.

10. The method of claim 1, wherein, based on the second data including a plurality of transport blocks, the second ACK/NACK information is determined by spatial bundling based on a logical OR operation performed on the plurality of transport blocks.

11. The method of claim 1, wherein the first data and the second data are transmitted through an unlicensed band.

12. The method of claim 1, further comprising receiving a grant which schedules the second data.

13. The method of claim 1, wherein based on the transmission mode 1 of the AUL transmission, the size of the HARQ-ACK bitmap is 16 bits, and based on a transmission mode 2 of the AUL transmission, the size of the HARQ-ACK bitmap is 32 bits.

14. A user equipment (UE) comprising:
a transceiver; and
a processor configured to operate in connection with the transceiver,
wherein the processor is configured to:
transmit first data based on an autonomous uplink (AUL) transmission to a base station,
transmit second data based on a grant-based uplink transmission to the base station,
receive first acknowledgement/negative acknowledgement (ACK/NACK) information for the first data and second ACK/NACK information for the second data through a hybrid automatic repeat request (HARQ)-ACK bitmap included in an AUL-downlink feedback indication (AUL-DFI), and
adjust a contention window size (CWS) based on at least one of the first ACK/NACK information and the second ACK/NACK information included in the HARQ-ACK bitmap,
wherein a size of the HARQ-ACK bitmap is dependent on a transmission mode of the AUL transmission, and
wherein, based on (i) the AUL transmission configured with a transmission mode 1 in which only one transport block is included in a subframe, and (ii) the grant-based uplink transmission configured with a transmission mode 2 in which 2 transport blocks are included in a subframe: the second ACK/NACK information included in the HARQ-ACK bitmap is ACK based on ACK/NACK for at least one of the 2 transport blocks being ACK and the second ACK/NACK information included in the HARQ-ACK bitmap is NACK based on ACK/NACKs for the 2 transport blocks all being NACKs.

15. A processor configured to operate in a wireless communication device in a wireless communication system,
wherein the processor is configured to control the wireless communication device to:
transmit first data based on an autonomous uplink (AUL) transmission to a base station;
transmit second data based on a grant-based uplink transmission to the base station;
receive first acknowledgement/negative acknowledgement (ACK/NACK) information for the first data and second ACK/NACK information for the second data through a hybrid automatic repeat request (HARQ)-ACK bitmap included in an AUL-downlink feedback indication (AUL-DFI); and
adjust a contention window size (CWS) based on at least one of the first ACK/NACK information and the second ACK/NACK information included in the HARQ-ACK bitmap,
wherein a size of the HARQ-ACK bitmap is dependent on a transmission mode of the AUL transmission, and
wherein, based on (i) the AUL transmission configured with a transmission mode 1 in which only one transport block is included in a subframe, and (ii) the grant-based uplink transmission configured with a transmission mode 2 in which 2 transport blocks are included in a subframe: the second ACK/NACK information included in the HARQ-ACK bitmap is ACK based on ACK/NACK for at least one of the 2 transport blocks being ACK and the second ACK/NACK information included in the HARQ-ACK bitmap is NACK based on ACK/NACKs for the 2 transport blocks all being NACKs.

* * * * *